(12) United States Patent
Lidar et al.

(10) Patent No.: US 7,364,923 B2
(45) Date of Patent: Apr. 29, 2008

(54) DRESSED QUBITS

(75) Inventors: Daniel A. Lidar, Toronto (CA); Lian-Ao Wu, Toronto (CA)

(73) Assignee: The Governing Council of the University of Toronto, Toronto (CA)

( * ) Notice: Subject to any disclaimer, the term of this patent is extended or adjusted under 35 U.S.C. 154(b) by 957 days.

(21) Appl. No.: 10/788,546

(22) Filed: Feb. 27, 2004

(65) Prior Publication Data
US 2004/0238813 A1 Dec. 2, 2004

Related U.S. Application Data

(60) Provisional application No. 60/451,913, filed on Mar. 3, 2003.

(51) Int. Cl.
*H01L 21/00* (2006.01)
(52) U.S. Cl. .......................... 438/17; 438/962; 257/31; 257/E21.529
(58) Field of Classification Search .................. 706/10
See application file for complete search history.

(56) References Cited

U.S. PATENT DOCUMENTS

| | | | |
|---|---|---|---|
| 5,768,297 A | 6/1998 | Shor | |
| 5,917,322 A | 6/1999 | Gershenfeld et al. | |
| 6,128,764 A | 10/2000 | Gottesman | |
| 6,456,994 B1 * | 9/2002 | Tucci ........................... | 706/52 |
| 6,472,681 B1 | 10/2002 | Kane | |
| 6,573,202 B2 * | 6/2003 | Ivanov et al. ............. | 324/76.11 |
| 6,597,010 B2 | 7/2003 | Eriksson et al. | |
| 6,649,929 B2 * | 11/2003 | Newns et al. .................. | 257/31 |
| 6,787,794 B2 * | 9/2004 | Cain et al. ..................... | 257/20 |
| 6,979,836 B2 * | 12/2005 | Zagoskin et al. ............. | 257/31 |
| 7,028,275 B1 * | 4/2006 | Chen et al. ..................... | 716/4 |
| 2003/0023651 A1 | 1/2003 | Whaley et al. | |
| 2003/0224944 A1 | 12/2003 | Il'ichev et al. | |
| 2004/0000666 A1 | 1/2004 | Lidar et al. | |
| 2004/0077503 A1 | 4/2004 | Blais et al. | |
| 2004/0119061 A1 | 6/2004 | Wu et al. | |

FOREIGN PATENT DOCUMENTS

WO    WO-99/14614 A1    3/1999
WO    PCT/CA2004/000324    8/2005

OTHER PUBLICATIONS

Bacon, D., J. Kempe, D.A. Lidar, and B. Whaley, 2000, "Universal Fault-Tolerant Computation on Decoherence-Free Subspaces," Phys. Rev. Lett. 85, pp. 1758-1761.

(Continued)

*Primary Examiner*—Stephen W. Smoot
(74) *Attorney, Agent, or Firm*—Seed IP Law Group PLLC

(57) ABSTRACT

A quantum computing method comprising constructing a dressing transformation V between a physical Hamiltonian H and an ideal Hamiltonian $H^{ID}$. The physical Hamiltonian H describes a physical quantum computer that comprises a plurality of qubits, including interactions between the plurality of qubits and a continuum. The ideal Hamiltonian $H^{ID}$ describes the universal quantum computer that corresponds to the physical quantum computer. Each qubit in the plurality of qubits is initialized and quantum calculations are performed using the plurality of qubits. Measurement of the plurality of qubits is performed in the dressed state.

29 Claims, 6 Drawing Sheets

OTHER PUBLICATIONS

Barenco, A., C.H. Bennett, R. Cleve, D.P. DiVincenzo, N. Margolus, P. Shor, T. Sleator, J.A. Smolin, and H. Weinfurter, 1995, "Elementary gates for quantum computation," Phys. Rev. A 52, 3457-3467.

Bonesteel, N. E., D. Stepanenko, and D. P. DiVincenzo, 2001, "Anisotropic Spin Exchange in Pulsed Quantum Gates," Phys. Rev. Lett. 87, 207901.

Burkard, G., and D. Loss, 2002, "Cancellation of Spin-Orbit Effects in Quantum Gates Based on the Exchange Coupling in Quantum Dots," Phys. Rev. Lett. 88, 047903.

Burkard, G., D. Loss, and D.P. DiVincenzo, 1998, "Coupled quantum dots as quantum gates," arXiv.org: cond-mat/9808026.

Byrd, M.S., L.A. Wu, D.A. Lidar, 2004, "Overview of Quantum Error Prevention and Leakage Elimination," arXiv.org:quant-ph/0402098 also published as Journal of Modern Optics 51, p. 2449 (2004).

Cummins, H.K., G. Liewellyn, and J.A. Jones, 2002, "Tackling Systematic Errors in Quantum Logic Gates with Composite Rotations," arXiv.org: quant-ph/0208092.

D'Ariano, G.M., and P. Lo Presti, 2001, "Quantum Tomography for Measuring Experimentally the Matrix Elements of an Arbitrary Quantum Operation," Phys. Rev. Lett. 86, pp. 4195-4198.

DiVincenzo, D.P., D. Bacon, J. Kempe, G. Burkard, and K.B. Whaley, 2000, "Universal Quantum Computation with the Exchange Interaction," Nature 408, pp. 339-342 (2000).

DiVincenzo, D.P., 2001, "The Physical Implementation of Quantum Computation", in Scalable Quantum Computers, Braunstein and Lo, Eds., Wiley-VCH Verlag GmbH, Berlin, also published as arXiv.org: quant-ph/0002077 (2000).

Dodd, J.L., M. A. Nielsen, M.J. Bremner, and R.T. Thew, 2002, "Universal quantum computation and simulation using any entangling Hamiltonian and local unitaries," Phys. Rev. A 65, 040301.

Gea-Banacloche, J., 2000, "Error correction for mutually interacting qubits," Phys. Rev. A 62, 062313.

Kane, B.E., 1998, "A silicon-based nuclear spin quantum computer," Nature 393, pp. 133-137.

Kane, B.E., 2000, "Silicon-based Quantum Computation," Fortschr. Phys. 48, pp. 1023-1041.

Kavokin, K.V., 2001,"Anisotropic exchange interaction of localized conduction-band electrons in semiconductors," Phys. Rev. B 64, 075305.

Kempe, J., D. Bacon, D. A. Lidar, and K. B. Whaley, 2001,"Theory of decoherence-free fault-tolerant universal quantum computation," Phys. Rev. A 63, 042307.

Knill, E., R. Laflamme, and L. Viola, 2000, "Theory of Quantum Error Correction for General Noise," Phys. Rev. Lett. 84, 2525-2528.

Loss, D., and D.P. DiVincenzo, 1998, "Quantum computation with quantum dots," Phys. Rev. A 57, pp. 120-126.

Makhlin Yu., G. Schön, and A. Shnirman, 2001, "Quantum-State Engineering with Josephson-Junction Devices," Rev. of Mod. Phys. 73, pp. 357-401.

Ollerenshaw, J.E., D.A. Lidar, and L.E. Kay, 2003, "A Magnetic Resonance Realization of Decoherence-Free Quantum Computation," arXiv.org: quant-ph/0302175.

Palao, J.P., and R. Kosloff, 2002, "Quantum Computing by an Optimal Control Algorithm for Unitary Transformations," Phys. Rev. Lett. 89, 188301.

Preskill, J., 1998, "Reliable Quantum Computers," Proc. R. Soc. London, Ser. A 454, pp. 385-410.

Ramos, R.C., M.A. Gubrud, A.J. Berkley, J.R. Anderson, C.J. Lobb, and F.C. Wellstood, 2001, "Design for Effective Thermalization of Junctions for Quantum Coherence," IEEE Trans. App. Supercond. 11, pp. 998-1001.

Steane, A.M., 2002, "Overhead and noise threshold of fault-tolerant quantum error correction," arXiv.org: quant-ph/0207119.

Steane, A., C.F. Roos, D. Stevens, A. Mundt, D. Leibfried, F. Schmidt-Kaler, and R. Blatt, 2000, "Speed of ion-trap quantum-information processors," Phys. Rev. A 62, 042305.

Tian, L., and S. Lloyd, 2000, "Resonant cancellation of off-resonant effects in a multilevel qubit," Phys. Rev. A 62, 050301.

Wu, L.-A., and D. A. Lidar, 2002, "Universal quantum logic from Zeeman and anisotropic exchange interactions," Phys. Rev. A 66, 062314.

Wu, L.-A., and D.A. Lidar, 2003, "Dressed Qubits," Phys. Rev. Lett. 91, 097904.

Yu, Y., S. Han, X. Chu, S.-I Chu, and Z. Wang, 2002, "Coherent Temporal Oscillations of Macroscopic Quantum States in a Josephson Junction," Science 296, pp. 889-893.

Coulter, 1974, "Atoms in moderately strong electromagnetic fields: General method and its application to the two-level atom," Physical Review A 10, pp. 1946-1954.

Narducci et al., 1976, "Dressing transformation for a many atom-radiation field Hamiltonian," J. Phys. A: Math. Gen. 9, pp. L75-L77.

Inokuchi, T. et al., "Analog Computation using Quantum-Flux Parametron Devices," Physica C, 357-360, pp. 1618-1621, Department of Electrical Engineering, Hokkaido University, Kita 13, Nishi 8, Sapporo 060-8628, Japan, Jan. 12, 2001.

* cited by examiner

DRESSED QUBITS

CROSS REFERENCE TO RELATED APPLICATIONS

This application claims priority to U.S. Provisional Patent Application No. 60/451,913, entitled "Dressed Qubits," filed Mar. 3, 2003, which is hereby incorporated by reference in its entirety.

FIELD OF THE INVENTION

The present invention relates to methods and apparatus for performing quantum information processing in a practical and reliable fashion. The present invention is broadly applicable in the rapidly developing field of quantum computing.

BACKGROUND OF THE INVENTION

Quantum Computing. Research on what is now called quantum computing traces to at least as far back as R. Feynman, see Feynman, 1982, International Journal of Theoretical Physics 21, pp. 467-488, which is hereby incorporated by reference in its entirety. Feynman noted that quantum systems are inherently difficult to simulate with conventional computers but that observing the evolution of an analogous quantum system could provide an exponentially faster way to solve the mathematical model of a system. In particular, solving a model for the behavior of a quantum system commonly involves solving a differential equation related to the Hamiltonian of the quantum system. David Deutsch observed that a quantum system could be used to yield a time saving, later shown to include exponential time savings, in certain computations. If one had a problem, modeled in the form of an equation that is analogous to the Hamiltonian of the quantum system, the behavior of the system could provide information regarding the solutions to the equation. See Deutsch, 1985, Proceedings of the Royal Society of London A 400, pp. 97-117, which is hereby incorporated by reference in its entirety.

Several solid state embodiments have been proposed for scalable quantum computers. These include superconducting qubits comprised of superconducting material and Josephson junctions. One such proposal was published in 1997. See Bocko et al., 1997, IEEE Transactions of Applied Superconductivity 7, pp. 3638-3641, which is hereby incorporated by reference in its entirety. Since that time, many superconducting qubits have been disclosed. For a review of the field see Makhlin et al., 2002, Reviews of Modern Physics 73, pp. 357-400, which is hereby incorporated by reference in its entirety.

Additional solid state quantum computers include those based on coupled spin systems. These proposals include coupled quantum dots. See, for example, Loss and DiVincenzo, 1998, Physical Review A 57, pp. 120-126, which is hereby incorporated by reference in its entirety. An additional example of a coupled spin system is donor atoms with non zero nuclear spin, e.g. $P^{31}$, implanted in homogenous arrays zero nuclear spin silicon, see U.S. Pat. No. 6,472,681, which is hereby incorporated by reference in its entirety.

Qubits. A qubit is the fundamental building block of a quantum computer. The qubit has two basis states, which are often labeled $|0\rangle$ and $|1\rangle$. Notation like '$|\rangle$' is called Dirac notation, and it is the standard notation for states in quantum mechanics. See, for example, Nielsen & Chuang, 2000, Quantum Computation and Quantum Information, Cambridge University Press, Cambridge. The similarities between these quantum basis states and the binary 0 and 1 states make these quantum states promising candidates for purposes of computation. The difference between bits and qubits is that a qubit can be in a state other that $|0\rangle$ or $|1\rangle$. It is also possible to form linear combinations of states, often called superpositions:

$$|\psi\rangle = \alpha|0\rangle + \beta|1\rangle$$

The numbers $\alpha$ and $\beta$ are complex numbers, where $|\alpha|^2 + |\beta|^2 = 1$. Put another way, the state of a qubit is a vector in a two-dimensional complex vector space. The special states $|0\rangle$ and $|1\rangle$ are known as computational basis states, and form an orthonormal basis for this vector space. A qubit is capable of evolving from one state to another state in a quantum mechanical manner. As mentioned before, a qubit can be in a superposition of both basis states. In simplified terms, this can be described as the qubit being in both quantum basis states a once. For more information on qubits, see DiVincenzo in Braunstein and Lo (eds.), 2001, Scalable quantum computers, Wiley-VCH, New York.

A classical bit can be examined to determine whether it is in the state 0 or 1. For example, classical computers do this all the time when they retrieve the contents of their memory. In contrast, a qubit cannot be directly examined to determine its quantum state, that is, the values $\alpha$ and $\beta$. However, because qubits adhere to the laws of quantum mechanics, when a qubit is measured it reverts to a classical state. The measurement can be either the result 0, with probability $|\alpha|^2$, or the result 1, with probability $|\beta|^2$. Further as $|\alpha|^2 + |\beta|^2 = 1$, the probabilities must sum to one. Geometrically, this can be interpreted as the condition that the qubit's state be normalized to length 1. Thus, in general a qubit's state is a unit vector in a two-dimensional complex vector space. One representation of such a space is a Bloch sphere. See, for example, Nielsen and Chuang, 2000, Quantum Computation and Quantum Information, Cambridge University Press, Cambridge.

Single qubit terms. Classical computer circuits consist of wires and logic gates. The wires are used to carry information around the circuit, while the logic gates perform manipulations of the information, converting it from one form to another. Consider, for example, classical single bit logic gates. The only non-trivial member of this class is the NOT gate, whose operation is defined by its truth table, in which $0 \rightarrow 1$ and $1 \rightarrow 0$, that is, the 0 and 1 states are interchanged. By comparison, the quantum NOT gate acts linearly to take the state $$\alpha|0\rangle + \beta|1\rangle$$

to the corresponding state in which the role of $|0\rangle$ and $|1\rangle$ have been interchanged, $$\alpha|1\rangle + \beta|0\rangle.$$

There is a convenient way of representing the quantum NOT gate in matrix form, which follows directly from the linearity of quantum gates. Suppose a matrix $\sigma^X$ is defined to represent the quantum NOT gate as follows:

$$\sigma^X \equiv \begin{pmatrix} 0 & 1 \\ 1 & 0 \end{pmatrix}$$

(The notation $\sigma^X$ for the quantum NOT gate is used for historical reasons). The quantum state $\alpha|0\rangle+\beta|1\rangle$ of a qubit can be written in a vector notation as:

$$\begin{bmatrix} \alpha \\ \beta \end{bmatrix},$$

with the top entry corresponding to the probability amplitude for $|0\rangle$ and the bottom entry the probability amplitude for $|1\rangle$. Then, the corresponding output from the quantum NOT gate is $$\sigma^X \begin{bmatrix} \alpha \\ \beta \end{bmatrix} = \begin{bmatrix} \beta \\ \alpha \end{bmatrix}.$$

As the above example indicates, single qubit quantum gates can be described by two by two matrices, subject to the limitation that the matrix representing the gate is unitary. Thus, if U is a matrix describing a single qubit gate, the condition $U^\dagger U=I$, where $U^\dagger$ is the adjoint of U (obtained by transposing and then complex conjugating U), and I is the two by two identity matrix. The single qubit gate $\sigma^X$ is one of the Pauli matrices. In fact, each of the three Pauli matrices serve as a unique single-qubit gate. The other Pauli matrices (operators) are:

$$\sigma^Y = \begin{pmatrix} 0 & -i \\ i & 0 \end{pmatrix}$$

$$\sigma^Z = \begin{pmatrix} 1 & 0 \\ 0 & -1 \end{pmatrix}$$

Two by two matrices are not the only way to represent single qubit quantum operations. One can also use creation and annihilation operators. Creation and annihilation operators are described more fully in the example section below. For more information on creation and annihilation operators, see Sakurai and Tuan, 1994, Modern Quantum Mechanics Revised Edition, Addison-Wesley Publishing Company, which is hereby incorporated by reference in its entirety.

Two qubit terms. In most quantum computing system designs, qubits are coupled together, often pair-wise. The functions of such pair-wise couplings include facilitating the entanglement of the quantum basis states of the coupled qubits. Systems can be designed with many different couplings. As an example, qubits can be coupled by Josephson coupling. Such coupling is represented in the Hamiltonian that describes the coupled qubits by a $\sigma^Z_i \otimes \sigma^Z_j$ term, where the "$\otimes$" denotes the tensor product. This two qubit term acts on the tensor product of the two states of the $i^{th}$ and $j^{th}$ qubit, having $2*2=4$ components and thus is represented by a four dimensional vector. The interaction term can be used to generate the CPHASE gate. In the present basis the interaction term reads:

$$\sigma^Z \otimes \sigma^Z = \begin{pmatrix} 1 & 0 & 0 & 0 \\ 0 & -1 & 0 & 0 \\ 0 & 0 & -1 & 0 \\ 0 & 0 & 0 & 1 \end{pmatrix}$$

Hamiltonians. The Hamiltonian describes the dynamics of a quantum computer. The Hamiltonian can include one and two qubit terms. One qubit operations include $\sigma^X$, representing transitions from one quantum state to the other, for example, by tunneling between basis states. The one qubit term $\sigma^Z$, represents the bias of the qubit, caused by the difference between the energies of the two quantum states. Such bias can be caused in many different ways, including an external magnetic field.

If the system of quantum states, e.g. the basis of the qubit, is chosen differently, then the Pauli operators are represented by a different set of matrices. With respect to superconducting qubits, various choices of the quantum states are discussed in Makhlin et al., 2001, Reviews of Modern Physics 73, pp. 357-400, which is hereby incorporated by reference in its entirety. These choices include representing the quantum states of the qubit according to the charge or the phase of the qubit.

Using the Hamiltonian terms, such as the single qubit terms $\sigma^X$, $\sigma^Y$, and $\sigma^Z$ and the two qubit term $\sigma^Z_i \otimes \sigma^Z_j$ as defined above, the Hamiltonian of a quantum computer can be constructed. The Hamiltonian of a quantum computer is a series of Hamiltonian terms, indexed for each qubit or qubit pair, which may have time varying coefficients that represent the strength of the Hamiltonian term. See Nielsen and Chuang, 2000, Quantum Computation and Information Processing, Cambridge University Press, which is hereby incorporated by reference in its entirety.

Universal quantum computation. To make a practical design for a quantum computer, it is believed that one must specify how to decompose any valid quantum computation into a sequence of elementary 1- and 2-qubit quantum gates that can be realized in physical hardware that is feasible to fabricate. The set of these 1- and 2-qubit gates is arbitrary provided it is universal, i.e., capable of achieving any valid quantum computation by only using gates from this set. A widely accepted method of operating quantum computers is the "standard paradigm" of universal quantum computation. According to the standard paradigm, all operations necessary for a quantum computer can be performed by appropriate application of a set of single qubit gates and one two qubit gate, because these operations generate the full special unitary 2 group, denoted $SU(2^N)$, and span the space necessary for quantum computation.

A group G, such as the $SU(2^N)$ group, is a set of elements together with a binary operation that satisfy the four fundamental properties of closure, associativity, the identity property, and the inverse property. The operation with respect to which a group is defined is often called the "group operation," and a set is said to be a group "under" this operation. In other words, elements A, B, C, . . . , with binary operation between A and B denoted AB, form a group when they have the following properties:

(i) closure: if A and B are two elements in G, then the product AB is also in G;

(ii) associativity: the defined multiplication is associative, e.g., for all A, B, C∈G, (AB)C=A(BC);

(iii) identity: there is an identity element I (a.k.a., I, 1) such that IA=AI=A for every element A∈G; and (iv) inverse: there must be an inverse or reciprocal of each element. Therefore, the set must contain an element $B=A^{-1}$ such that $AA^{-1}=A^{-1}A=I$ for each element of G.

The $SU(2^N)$ group satisfies these conditions. The $SU(2^N)$ group is a subset of the unitary $2^N$ group ($U(2^N)$). Unitary $2^N$ is a group where the objects are 2 by 2 matrices that are unitary, i.e., $UU^\dagger=1$ or $U(U^T)^*=1$, and the operation is matrix multiplication. $SU(2^N)$ has the general group element:

$$U = \begin{pmatrix} a & b \\ -b^* & a^* \end{pmatrix}$$

with $|a|^2+|b|^2=1$ and where a and b are complex. For more information on special unitary groups, see Arfken, 1985, Mathematical Methods for Physicists, Third Edition, Academic Press, Inc., San Francisco.

Quantum computers that generate the full $SU(2^N)$ group space for N qubits are sometimes referred to as universal quantum computers. In particular, two single qubit gates that are based on two non-commuting Hermitian operators, can generate all one qubit quantum gates. A matrix is Hermitian when $A^\dagger=A$. A matrix B is both Hermitian and Unitary when $BB^\dagger=I$, and $B^\dagger=B$, hence $B=B^{-1}$. Two qubit gates can entangle the states of two qubit quantum systems.

A common example of a two qubit gate is the controlled NOT (CNOT) gate. The CNOT gate has two input qubits, known as the control qubit and the target qubit, respectively. The action of the CNOT gate can be described as follows. If the control qubit is set to |0⟩, then the target qubit is left alone. If the control qubit is set to |1⟩, then a NOT gate is applied to the target qubit. Many other classical (e.g. AND) or quantum (e.g. CPHASE) two qubit logic gates can be used. However, it is necessary to modify some classical gates to have two outputs. Alternatively, one can use a discrete set of single qubit operations in addition to an entangling two qubit gate operation to approximate, to any desired accuracy, any quantum gate. An example of a discrete set of logic gates is HADAMARD, PHASE (or s), π/8 (or T), and an entangling gate such as CNOT. See Nielsen and Chuang, 2000, Quantum Computation and Information Processing, Cambridge University Press, which is hereby incorporated by reference in its entirety.

Handling errors in quantum computers. Quantum computers are physical devices that contain error sources, also termed noise, which is generated by undesired physical processes. The early history of classical computing included much effort to remove noise from classical computers, e.g. Hamming codes. These errors can be systemic or random and can affect individual qubits, or the entire quantum computer. Preventive error correction schemes for quantum computing exist. See, for example, U.S. Pat. Nos. 5,768,297, 6,128,764, U.S. patent application Publication 2004/0000666A1, "Encoding and Error Suppression for Superconducting Quantum Computers" to Lidar et al., and U.S. patent application Publication 20030023651 A1 entitled "Quantum computation" to Whaley et al., which are hereby incorporated by reference. Error correction techniques have been experimentally verified. For example, see Ollerenshaw, Lidar, and Kay, 2003, "A Magnetic Resonance Realization of Decoherence-Free Quantum Computation," arxiv.org: quant-ph/0302175, M. S. Byrd, L.-A. Wu, D. A. Lidar, "Overview of Quantum Error Prevention and Leakage Elimination," arxiv.org: quant-ph/0402098 (2004), each of which is hereby incorporated by reference.

Many quantum error correction schemes require encoding redundancy, either spatial or temporal. Alternatively they could impose expensive operational constraints. Spatial redundancy is where extra qubits are used to encode the states of one logical qubit into more than one physical qubit, e.g. concatenating a plurality of physical qubits together to form a logical qubit. Temporal redundancy is where extra gates need to be applied during the quantum computation. The use of these extra gates means that the quantum computer must run for a longer time, which may not be possible if this longer time exceeds the coherence time of the quantum computer. Error correction schemes that can impose expensive operational constraints on a quantum computer include schemes like Bang-Bang decoupling methods. These methods require fast pulses, where fast is defined as being faster than the characteristic time of the qubits. The requirement of false pulse indicates that implementation of Bang-Bang decoupling may require expensive equipment.

Given the above background, there is clearly a need in the art for improved methods of quantum computation that have reduced reliance on expensive error correction protocols.

SUMMARY OF THE INVENTION

The present invention provides improved methods for quantum computation that have reduced reliance on error correction protocols. In the methods of the present invention, the dressed state of a qubit in a quantum computer is utilized. The dressed state of a qubit is a representation of a state of the qubit in a dressed basis. The dressed basis differs from an undressed representation of the state of a qubit (undressed basis) in the sense that the dressed basis accounts for interactions between the qubit and higher order basis states, such as the continuum, whereas the undressed basis does not consider such interactions.

One aspect of the invention provides a quantum computing method. In the method, a dressing transformation V is constructed between a physical Hamiltonian H and an ideal Hamiltonian $H^{ID}$: $H^{ID}=V^\dagger HV$. The physical Hamiltonian H describes a physical quantum computer that comprises a plurality of qubits, including interactions between the plurality of qubits and a continuum. The ideal Hamiltonian $H^{ID}$ describes the universal quantum computer that corresponds to the physical quantum computer. For any given dressed state |ψ⟩ of the physical quantum computer, the dressing transformation V has the property that $|\psi\rangle = V^\dagger |\psi^{ID}\rangle$ where, $|\psi^{ID}\rangle$ is an undressed state in the universal quantum computer that corresponds to the given dressed state |ψ⟩ of the physical quantum computer, and $V^\dagger$ is the Hermitian conjugate of the dressing transformation V. In embodiments of the present invention $V^\dagger$, is called the undressing transformation. Each qubit in the plurality of qubits is initialized and a quantum calculation is performed using the plurality of qubits. Then the plurality of qubits are measured in a dressed state.

In some embodiments, the physical Hamiltonian H is determined by characterizing the physical quantum computer. The physical quantum computer can be characterized in a variety of ways, such as quantum process tomography.

The dressed state |ψ⟩ of the physical quantum computer represents the state of each qubit in the plurality of qubits. The dressed state of a qubit includes basis states that represent interactions between a first or/and a second undressed basis state of the qubit (e.g., |0⟩ and |1⟩) and a continuum of basis states of the qubit. In some instances, the continuum of basis states of the qubit is simply represented as |2⟩ in the dressed state.

The undressed state $|\psi^{ID}\rangle$ of the universal quantum computer differs from the corresponding dressed state $|\psi\rangle$ of the physical quantum computer. The undressed state represents the state of each qubit in the plurality of qubits. However, the undressed state of a qubit does not include a basis state that represents interactions between a first or a second basis state of the qubit (e.g., |0⟩ and |1⟩) and a continuum of basis states of the qubit.

In some embodiments, the qubits of the physical quantum computer are initialized by placing them in a known dressed state after the dressing transformation has been constructed. Then, a quantum calculation is performed on the qubits. In some embodiments, the quantum calculations that are performed are effected by applying a plurality of quantum gates to the qubits of the physical quantum computer. In some embodiments, the quantum gates applied to the quantum computer are in an undressed basis. In some embodiments, a quantum gate in the plurality of quantum gates is converted from an ideal (undressed) basis to a dressed basis by application of the undressing transformation prior to application of the quantum gate to the physical quantum computer.

In some embodiments, the dressing transformation has the property that $H = V^\dagger H^{ID} V$. In some embodiments, the dressing transformation is separable with respect to the plurality of qubits. In other embodiments, the dressing transformation is non-separable with respect to the plurality of qubits.

In some embodiments, measurement of the plurality of qubits in the dressed basis comprises measuring the plurality of qubits in an undressed basis to form a result and then applying the dressing transformation to the result using a post-processing method.

In some embodiments, initializing of the plurality of qubits comprises placing one or more qubits in the plurality of qubits in a pure fiducial state that is basis independent with respect to both a dressed state and an undressed state. An example of this embodiment is the case where one or more qubits are current biased Josephson junctions and the pure fiducial state that is basis independent with respect to the dressed state and the undressed state is $\psi_0$, where $\psi_0 = |1\rangle$ and $\psi_0 = |1^{ID}\rangle$.

In some embodiments, initialization of each qubit in the plurality of qubits comprises relaxing one or more of the plurality of qubits to a pure undressed ground state that is basis independent with respect to both a dressed state and an undressed state. In some instances, this relaxation is achieved by cooling the one or more qubits for a sufficiently long time to fully populate the pure undressed ground state.

In some embodiments, initializing each qubit in the plurality of qubits comprises relaxing the plurality of qubits to an undressed ground state that does not have a known corresponding dressed state. Then, measurement includes applying the dressing transformation to the plurality of qubits. An example of this embodiment is the case where the plurality of qubits are electron-spin coupled by Heisenberg exchange interactions (e.g., quantum dots or donor atoms in silicon arrays).

In some embodiments, initialization of each qubit in the plurality of qubits comprises relaxing a qubit in the plurality of qubits to an undressed ground state that has a known corresponding dressed state. An example of this embodiment is the case where the qubit is a current biased Josephson junction. Here, initializing comprises setting the qubit to the ground state $\psi_g$, where $\psi_g$, when expressed in bases selected from an undressed state, is $|0^{ID}\rangle$, and where $\psi_g$, when expressed in bases selected from the dressed state, is $\cos(\phi)|0\rangle - \sin(\phi)|2\rangle$, where $\phi$ is a representation of the interaction of the |0⟩ and |1⟩ basis states with higher basis states of the current biased Josephson junction.

In some embodiments, the initializing of each qubit in the plurality of qubits comprises relaxing the plurality of qubits to an undressed ground state that does not have a known corresponding dressed state. Then, the dressing transformation is applied to each respective qubit in the plurality of qubits while it is in the undressed ground state thereby causing the respective qubit to adopt a quantum state $\psi$ that, when expressed in terms of the dressed basis, is pure. An example of such an embodiment is the case where the plurality of qubits are characterized by a Heisenberg exchange interaction.

The present invention determines and makes use of a dressing transformation that improves methods for quantum computation. In a method of the present invention, a dressing transformation can be used to convert between the dressed and undressed instances of a quantum computer. In an embodiment of the present invention, a quantum computer of N physical or encoded qubits possesses a set of experimentally controllable physical (or dressed) Hamiltonians (and corresponding evolution operators) $H = \{H_\alpha\}$ where $\alpha$ is an index, and $U(\theta) = \{U_\alpha\}$ where $U_\alpha = \exp(-i\theta_\alpha H_\alpha)$, which may contain inherent errors. Correspondingly, in this embodiment, there is an idealized set of ideal (or undressed) Hamiltonians (or corresponding evolution operators) $H^{ID} = H_\alpha^{ID}$ (and $U^{ID} \exp(-i\theta^{ID}_\alpha H^{ID}_\alpha)$), which is known to be universal.

Embodiments of the present invention determine and make use of a unitary dressing transformation that can convert the undressed Hamiltonians into the dressed Hamiltonians. This is desirable because the dressed Hamiltonians take into account interactions the qubits, which are described by the Hamiltonians, have with the continuum. In embodiments of the present invention the dressing transformation is defined as V, where $H_\alpha = V^\dagger H^{ID}_\alpha V$ for all $\alpha$ where $\alpha$ is an index to individual Hamiltonian terms. In embodiments of the present invention the dressing transformation is defined as $V^\dagger$.

Embodiments of the present invention determine a unitary dressing transformation that can convert the undressed states into the dressed states. Embodiments of the present invention determine a unitary dressing transformation that can convert the dressed states into the undressed states. In embodiments of the present invention, the set $H^{ID}$ can be used to generate a transformation between an arbitrary undressed state, or state of the ideal quantum computer, defined over many qubits, $|\Psi^{ID}\rangle$ and another such state $|\Phi^{ID}\rangle$. In an embodiment of the present invention, the matrix elements in the dressed basis are identical to those in the undressed basis. Hence, quantum computing in the dressed and undressed quantum computer are equivalent in terms universality.

Embodiments of the present invention make use of a previously determined unitary dressing transformation that can convert the undressed states into the dressed states. Embodiments of the present invention make use of a previously determined unitary dressing transformation that can convert the dressed states into the undressed states. In embodiments of the present invention, a known dressing transformation can be used to transform an arbitrary undressed state, or state of the ideal quantum computer, defined over many qubits, $\Psi^{ID}\rangle$ to dressed state $|\Psi\rangle$.

Some embodiments of the present invention include a method for quantum computing where a dressing transformation is provided, quantum computation is performed, and the dressing transformation is used to interpret the results of the quantum computation. In such embodiments, a dressing transformation and a quantum computing system are provided. In examination of the quantum computing system, a dressed Hamiltonian is identified. Quantum computation including initializing the quantum computing system in a known state, then applying the dressed Hamiltonian; and reading out the state of quantum computing system is preformed. In such embodiments, the dressing transformation is used to undress the information readout from the quantum computing system. In such embodiments, the dressing transformation can be used to compute the dressed states of the quantum computing system.

Some embodiments of the present invention include a method for universal quantum computing on a physical system that is known to have a Hamiltonian set that does not permit universal quantum computation by determining appropriate dressed states. In such embodiments of the present invention, an ideal Hamiltonian set that is known to be universal and a Hamiltonian set for a physical system are provided. Using these Hamiltonian sets, a dressing transformation is computed. Using the dressing transformation, dressed states of the physical system can be computed such that the dressed states of the physical system and the Hamiltonian set for a physical system quantum computation using the Hamiltonian set is universal.

DETAILED DESCRIPTION OF THE INVENTION

Unlike quantum error correction, methods in accordance with the present invention need not impose spatial or temporal encoding redundancy. The dressed qubit methods of the present invention, using dressing transformations, dressed qubit states, and dressed Hamiltonians, can be implemented in all quantum computers and are useful to protect the operation of these quantum computers against noise, and other sources of error.

Known Qubits and Quantum Computers

There are numerous examples of known qubits and quantum computers. Surveys of the various quantum computers exist. See, for example, Braunstein and Lo, 2001, Scalable Quantum Computers, WILEY-VCH Verlag Berlin GmbH, which is hereby incorporated by reference in its entirety. The following physical systems in FIGS. 1 and 2, and the example section below, are used by way of illustration of quantum computers to which the present invention is applicable. The methods of the present invention are not limited to these examples of qubits or quantum computers. Rather, the systems and methods of the present invention are applicable to any quantum computing system that uses qubits.

Figure 1:
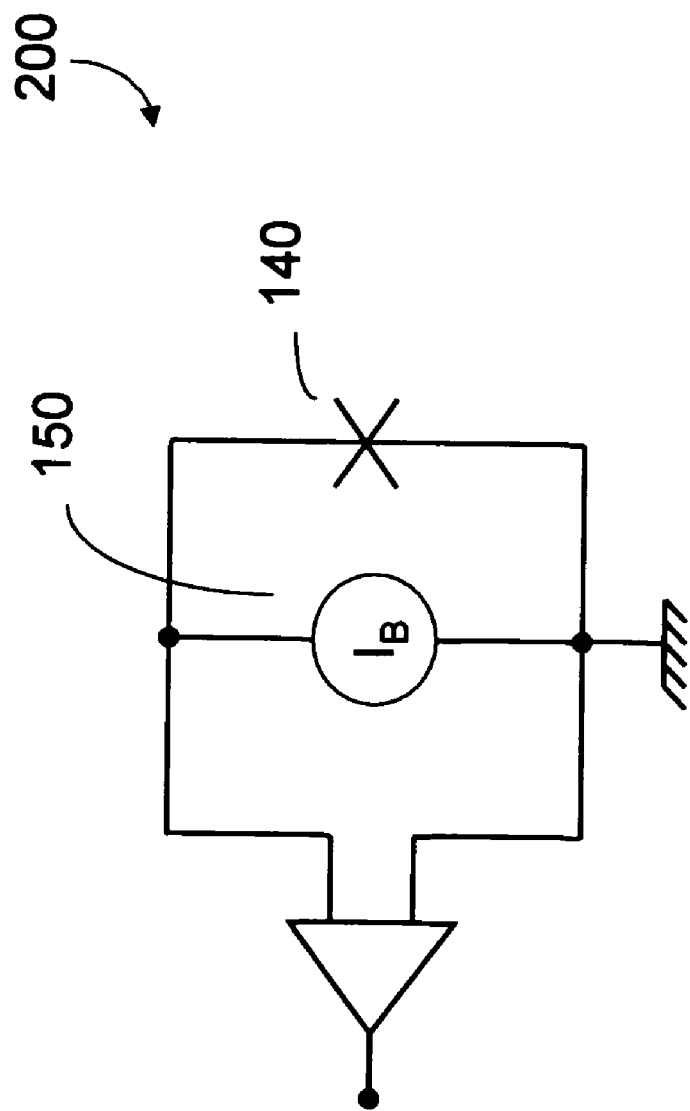
FIG. 1 illustrates an example of a superconducting qubit in accordance with the prior art.

FIG. 1 illustrates a superconducting qubit 200 having a current biased Josephson junction 140. Josephson junction 140 is denoted with an "X". A constant bias current is applied across Josephson junction 140. The bias current is applied by current source 150, which is connected to either terminal of the Josephson junction. During qubit operation, Josephson junction 140 is in a non-voltage state. That is, there is no voltage drop across Josephson junction 140. When the current across Josephson junction 140 exceeds the critical current of the junction, $I_C$, a voltage drop occurs across the junction. The critical current of a typical Josephson junction that is useful for quantum computing is about 200 milli-Amperes and such a junction typically includes an insulating tunneling barrier having a thickness of about 50 nanometers to about 800 nanometers and has a junction surface area of about 10 micrometers by 10 micrometers. Alternative embodiments of a Josephson junction 140 useful for quantum computing has an $I_C$ ranging from 1 milli-Amperes to 900 milli-Amperes.

Figure 2:
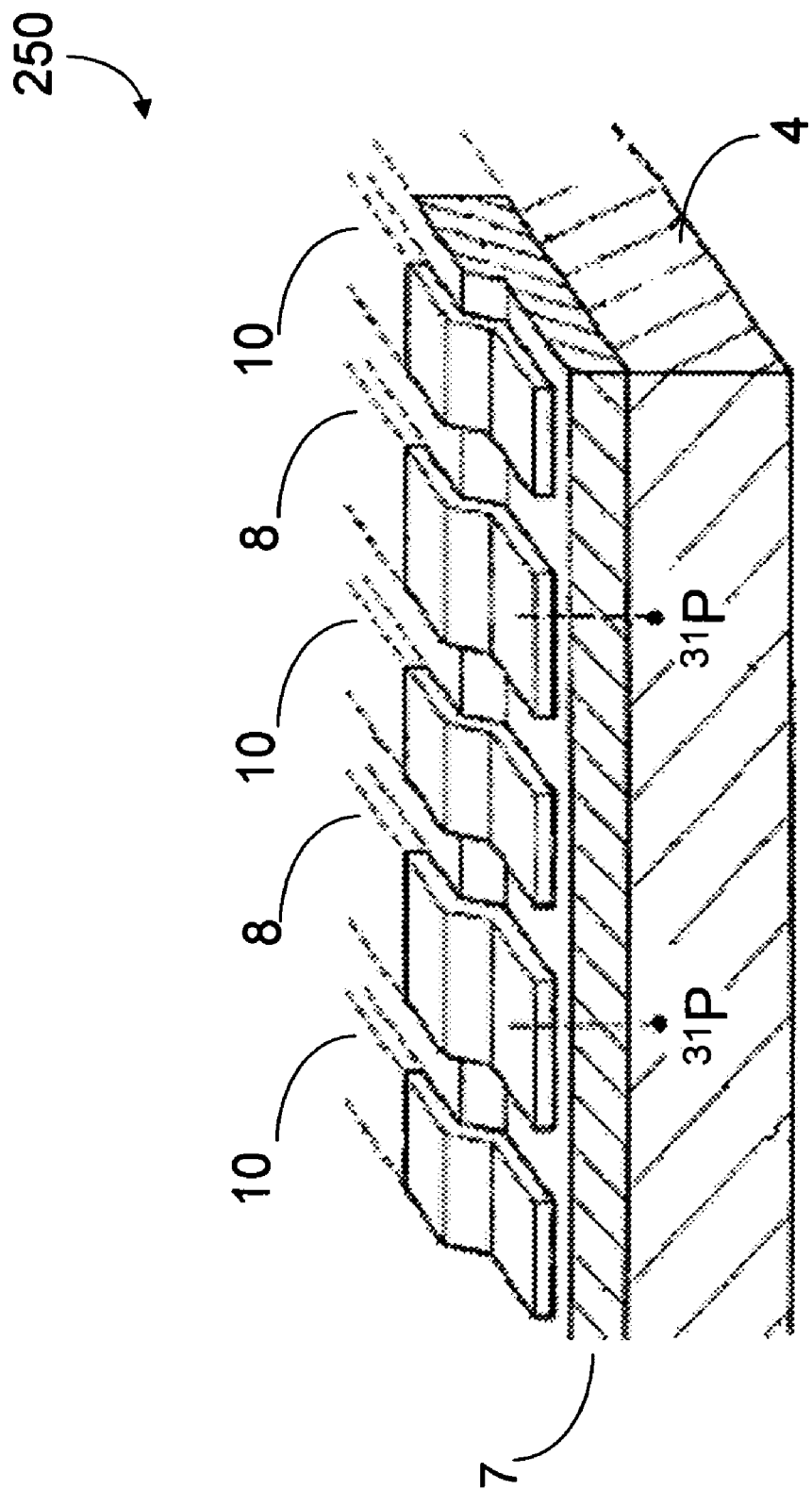
FIG. 2 illustrates a spin coupled solid state register of qubits in accordance with the prior art.

FIG. 2 illustrates a quantum computer 250 from the known art. See U.S. Pat. No. 6,472,681, which is hereby incorporated by reference in its entirety. Quantum computer 250 includes a silicon semiconductor substrate 4 into which a one dimensional array of donor atoms of phosphorous-31 ($^{31}$P) is introduced to produce an array nuclear spin electron system having large electron wave functions at the nucleus of the donor atoms $^{31}$P. The substrate is selected from material that has no nuclear spin, i.e., $^{28}$Si, $^{30}$Si, or both. A SiO$_2$ insulating layer 7 is placed above silicon substrate 4 onto which is placed A-gates 8 and J-gates 10. The A-gates are above $^{31}$P donor atoms and the J-gates are between $^{31}$P donor atoms. Varying the voltage on the A-gate controls the strength of the hyperfine interactions between the donated electrons around the $^{31}$P donor atom and the $^{31}$P donor atoms' nuclear spins. Varying the voltage on the J-gates turns on and off electron mediated coupling between the nuclear spins of adjacent $^{31}$P donor atoms. The quantum states of 250 are the directions of nuclear spins of the $^{31}$P donor atoms. Alternatives to using $^{31}$P as a donor atom include using $^{29}$Si, which is an example of a spin ½ particle.

Method for Preparing Dressing Transformations

Figure 3B:
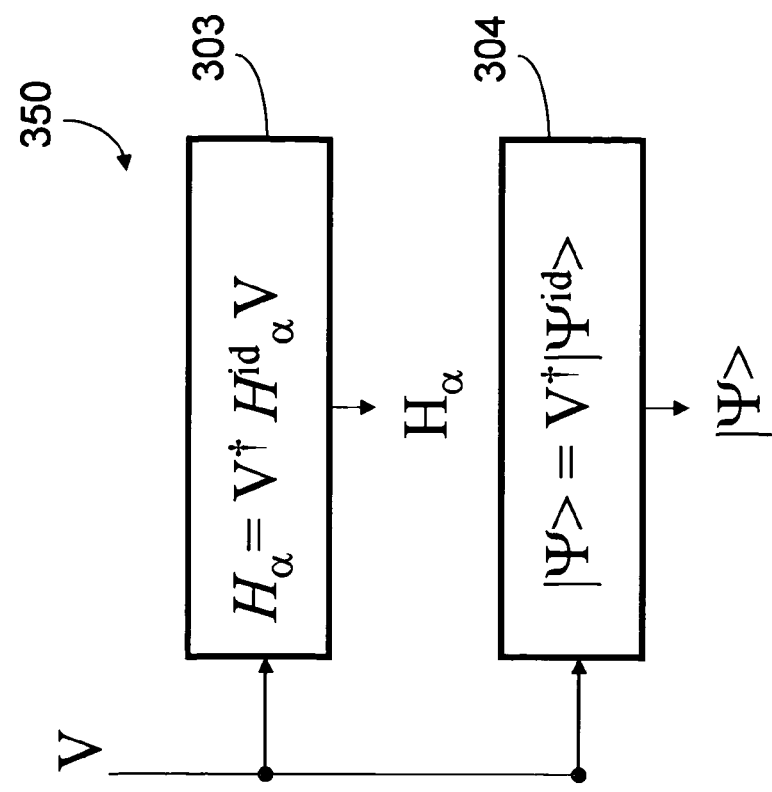
FIG. 3B illustrates a flowchart of a method for using a dressing transformation in accordance with the methods of the present invention.
Figure 3A:
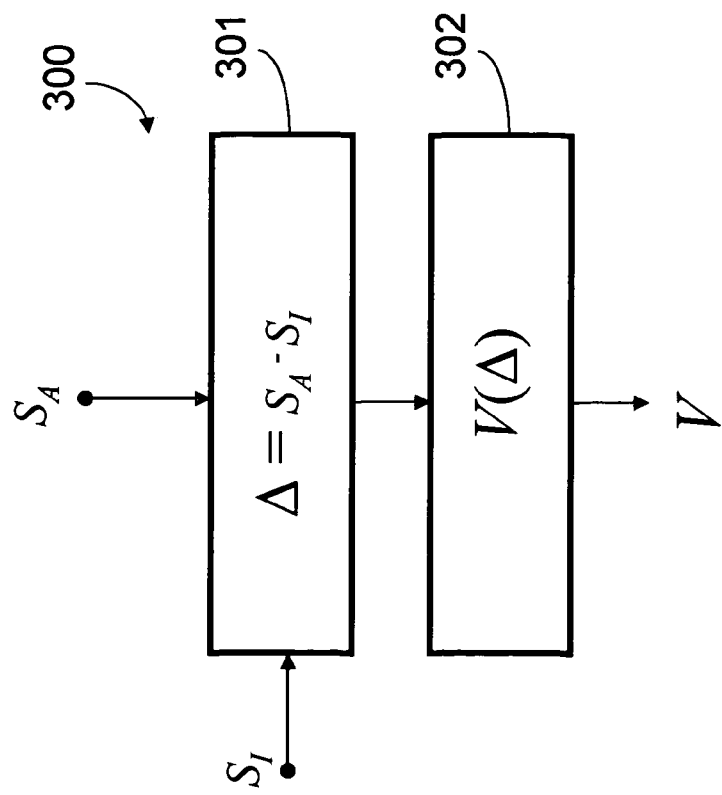
FIG. 3A illustrates a flowchart of a method for preparing a dressing transformation in accordance with the present invention.

FIG. 3A illustrates a flowchart 300 that is part of a method used to prepare dressed qubits in accordance with a method of the present invention. In step 301, the set of characteristics of the ideal quantum computer, denoted $S_I$, is taken as input. The set $S_I$ is to be compared to the set of characteristics of the actual quantum computer $S_A$. The characteristics of the actual quantum computer are determined in step 301. In step 301, the qualitative and quantitative differences of the two sets, denoted Δ, are determined. In step 302, a dressing transformation V for the actual quantum computer is computed. The output of flowchart 300 is a dressing transformation V.

Step 301. In step 301, a set of characteristics of the ideal quantum computer $S_I$ that is from the specification of the quantum computer is taken as input. Furthermore, the characteristics of the actual quantum computer $S_A$ are taken as input. The characteristics of the actual quantum computer $S_A$ can be determined through a variety of methods. For instance, they can be determined by measuring the various classical physical quantities of the quantum computer, e.g. every inductance, capacitance, critical current, etc. Further, the various quantum characteristics of the actual quantum computer $S_A$ can be determined using a custom built apparatus. One such apparatus is the impedance readout device for characterizing superconducting qubits. See, for example, U.S. patent application Publication 2003/0224944A1, entitled "Characterization and Measurement of Superconducting Structures," which is hereby incorporated in its entirety. The characteristics of the actual system can also be postulated from theoretical analysis of the ideal system, e.g., inclusion of higher order effects.

The characteristics of an actual quantum computer $S_A$ can also be determined by using specialized methods such as quantum process tomography. See, for example, Martini et al., 2002, "Exploiting quantum parallelism of entanglement for a complete experimental characterization of a single qubit device," arXiv.org: quant-ph/0210210 v1, which is hereby incorporated by reference. Martini et al., provide a method of quantum process tomography that allows for the complete characterization of quantum devices. This method exploits the intrinsic parallelism of quantum entanglement. Each qubit in an n-qubit device is characterized in Martini et al. by using a single entangled input state to play the role of all possible input states in quantum parallel in the device. See D'Ariano and Lo Presti, 2001, Physical Review Letters 86, pp. 4195-4198, which is hereby incorporated by reference. D'Ariano and Presti, use similar techniques to provide an estimation of a quantum operation via quantum process tomography. Boulant et al., 2002, "A Robust Method for Estimating the Lindblad Operators of a Dissipative Quantum Process from Measurements of the Density Operator at Multiple Time Points," arXiv.org:quant-ph/0211046 v1 provides additional quantum process tomography methods. The above mentioned techniques for characterizing a quantum system can be used in conjunction with each other.

Figure 5:
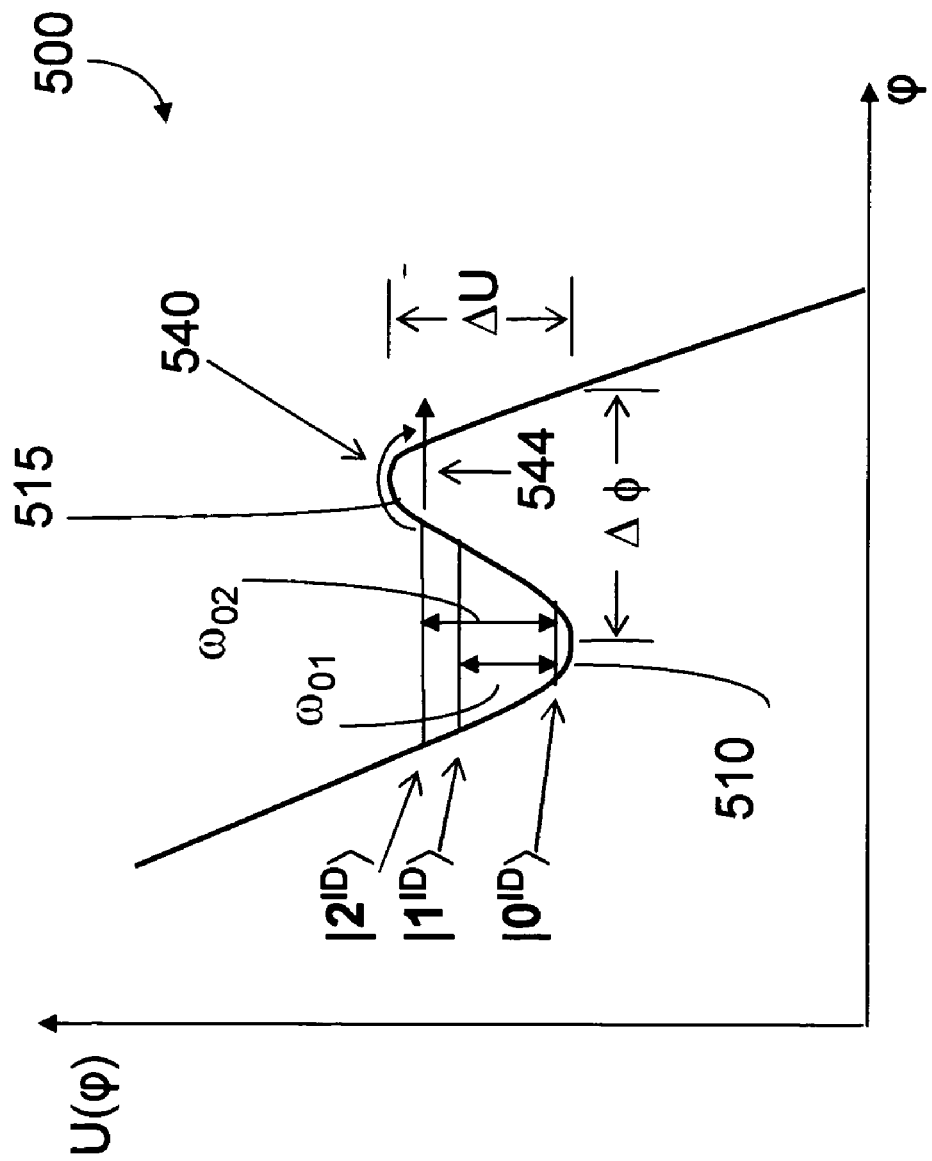
FIG. 5 illustrates a potential energy diagram of an exemplary quantum device.

In an embodiment of the present invention, the characteristics of an actual quantum computer, $S_A$, that suffers from leakage are determined. Leakage occurs when the information contained in the basis states of a quantum computer leaks to other quantum states. In an embodiment of the invention, a quantum computer that suffers from leakage can be determined and dressed to account for such leakage. An example of a qubit that can suffer from leakage (or off-resonant effects as described more fully in the example section below) is a current biased Josephson junction (CBJJ) (FIG. 1). A CBJJ can have the energy potential 500 shown in FIG. 5. The potential is a function of the phase of the Josephson junction $\phi$. The phase of the Josephson junction $\phi$ is the gauge-invariant phase difference of the two terminals of superconducting material on either side of the Josephson junction 140 (FIG. 1). The gauge-invariant phase difference is taken along the path that traverses the Josephson junction 140 from a first bank of superconducting material on one side of 140 to a second bank of superconducting material on the other side. See, for example, Tinkham, 1996, Introduction to superconductivity, McGraw-Hill, New York. The potential has a local minimum 510 and a barrier 515. Barrier 515 has a width $\Delta\phi$ and height $\Delta U$. Local minimum 510 and barrier 515 allow for the creation of metastable states for any basis state of the qubit 200 trapped behind barrier 515. When the CBJJ is above a critical temperature escape from the quantized energy levels, e.g. quantum basis states $|0^{ID}\rangle$, $|1^{ID}\rangle$, and $|2^{ID}\rangle$, behind 515 to a position of lower potential energy can occur either by thermal activation 540, or by tunneling through barrier 515. When the CBJJ is cooled below a critical temperature, escape is only possible by tunneling. The energy levels deep in the minimum are suitable for quantum computation because barrier 515 is the widest and highest at these levels and tunneling is suppressed to negligible levels.

In an embodiment of the present invention, the qualitative differences between the actual and ideal quantum computer are the differences in the Hamiltonian terms of the Hamiltonian of an ideal and a physical quantum computer. Both the ideal and physical quantum computers have Hamiltonians, respectively denoted $H^{ID}$ and $H$. Hamiltonians $H^{ID}$ and $H$ consist of Hamiltonian terms respectively denoted $H^{ID}_\alpha$ and $H_\alpha$, where $\alpha$ is an index. The differences in the Hamiltonian terms can be differences of magnitude, sign, or the entire form of the terms. In one example, an ideal Hamiltonian has a term proportional to $\sigma^X$ whereas the corresponding term in the physical Hamiltonian is proportional $-\sigma^X$. In another example, the ideal Hamiltonian has a term proportional to $\sigma^X$ whereas the corresponding term in the physical Hamiltonian is proportional to $\sigma^X+\sigma^Y$. The terms $\sigma^X$ and $\sigma^Y$ are defined in the background. The quantitative differences between $H^{ID}$ and $H$ are used to construct the dressing transformation V.

A common quantum operation is the quantum NOT operation, or $\sigma^X$, above. A NOT operation can be understood with reference to FIG. 5 which illustrates a energy potential 500 of an exemplary quantum device. In this case, a NOT operation is a transition from the basis state $|0^{ID}\rangle$ to $|1^{ID}\rangle$, or vice versa, or, more generally, the exchange of probability amplitudes between the $|0^{ID}\rangle$ and $|1^{ID}\rangle$ states. Leakage in such an operation causes a shift from the basis state $|0^{ID}\rangle$ or $|1^{ID}\rangle$ to basis state $|2^{ID}\rangle$. Although $|2^{ID}\rangle$ is a basis state, it is not the ideal bit space for quantum computation because it is not represented in the Hamiltonian $H^{ID}$. Note that the energy separation between $|1^{ID}\rangle$ and $|2^{ID}\rangle$ is less than the energy separation between $|0^{ID}\rangle$ and $|1^{ID}\rangle$. That is, $\omega_{02}-\omega_{01}<\omega_{01}$, where $\omega_{01}$ is the energy separation in frequency units (e.g. h=1) between $|0^{ID}\rangle$ and $|1^{ID}\rangle$. The proximity of basis state $|2^{ID}\rangle$ to that of basis state $|1^{ID}\rangle$ permits leakage into $|2^{ID}\rangle$ and higher levels (not shown). The form of the ideal Hamiltonian term for the NOT operation is $H^{ID}_1 = f\sigma^X$. The form of the physical Hamiltonian term in the presence of leakage is $H_1 = f\sigma^X + L$, where L is some leakage term. The dressing transformation will dress the Hamiltonian and qubits states of the actual system such that the leakage term is taken into account.

In an embodiment of the invention, the ideal characteristic set $S_I$ need not be an entirely theoretical set of characteristics. The quantity $\Delta$ can characterize the difference between the ideal of one type of realized quantum computer and the actual system being used.

Step 302. The dressing transformation V is a fixed unitary transform. The dressing transformation can act on Hamiltonians and basis states. This transformation is constructed such that $H_\alpha = V^\dagger H^{ID}_\alpha V$ for all $\alpha$ where $\alpha$ is an index to individual Hamiltonian terms. Here, $V^\dagger$ is the Hermitian conjugate of V. In other words, $V^\dagger = (V^T)^*$, where $V^T$ is the transpose of V and $(V^T)^*$ is the complex conjugate of $V^T$. Further, $H=\{H_\alpha | \alpha \in [0, N-1]\}$ is the set Hamiltonian terms of the actual system and $H^{ID} = \{H^{ID}_\alpha | \alpha \in [0, N-1]\}$ is from the ideal system. The dressing transformation takes the undressed state $|\Psi^{ID}\rangle$ to the dressed state $|\Psi\rangle$, where $|\Psi\rangle=V^{\dagger}|\Psi^{ID}\rangle$.

Embodiments of the present invention include dressing transformations that are either separable or non-separable. In embodiments of the invention where the dressing transformation is separable, it can be factored into N components where N is the number of qubits. The complete separable dressing transformation is $V_{sep}=\bigotimes_{j=1}^{N}V_j$. Each qubit has a dressing transformation that is combined by way of a tensor product to create the dressing transformation for the quantum computer. The instance of a separable dressing transformation is useful for visualizations. The physical Hamiltonian terms share essentially the same features of ideal Hamiltonian terms. Further, the $j^{th}$ dressed and undressed qubits are related by $|\Psi\rangle_j=V^{\dagger}_j|\Psi^{ID}\rangle_j$. In embodiments of the invention where the dressing transformation is non-separable the dressing formation is non-local, e.g. the dressed state of one qubit depends on the dressed states of at least one other qubit in the quantum computer.

Embodiments of the present invention can include dressed qubit states and physical Hamiltonians for quantum computers that are subject to leakage. In an embodiment of the present invention, the form of the ideal Hamiltonian term for a NOT operation on the first qubit is $H^{ID}_1=fJ_X$. The form of the physical Hamiltonian term in the presence of leakage is $H_1=fJ_X+f\delta J_Y$, where $J_X$ and $J_Y$ are non-commuting operators. The generation of $H_1$ from the ideal Hamiltonian term is a formulaic application of the equation $$\sqrt{1+\delta^2}e^{-i\phi J_Z}J_Xe^{i\phi J_Z}=J_X+\delta J_Y$$

where $$\delta=\tan\phi.$$

In the application of the dressing transformation, $V=\exp(-i\phi J_Z)$, where $J_Z$ is defined to satisfy the following commutation relations: $[J_Z, J_X]=iJ_Y$, and $[J_Y, J_Z]=iJ_X$, where the commutation relation of the form $[x,y]$ is defined as $xy-yx$.

Embodiments of the present invention include Hamiltonians for quantum computers that are comprised of the following terms:

$$X\equiv c_0^{\dagger}c_1+c_1^{\dagger}c_0$$

$$Y\equiv c_1^{\dagger}c_2+c_2^{\dagger}c_1$$

$$Z\equiv i(c_2^{\dagger}c_0-c_0^{\dagger}c_2)$$

$$Z'\equiv c_1^{\dagger}c_1$$

The creation operator for energy level $i$ is $c_i^{\dagger}$, and the annihilation operator is $c_i$. For instance instead of a having $H_1^{ID}=f\sqrt{1+\delta^2}X$, and $H_2^{ID}=\in Z'$ as Hamiltonians in the system, the physical Hamiltonians are $H_1=f[X+\delta Y]$ and $H_2=\in Z'$. Y is a leakage term of magnitude $\delta$. While $H^{ID}_1$ and $H^{ID}_2$ are sufficient for universal quantum computation for one qubit, $H_1$ and $H_2$ are not. That is because, while $H^{ID}_1$ and $H^{ID}_2$ can generate the SU(2) group for one qubit, $H_1$ and $H_2$ cannot. Like other qubits for which there exists a dressing transformation, terms $\{X, Y, Z\}$ satisfy the following commutation relations: $[Z,X]=iY$, and $[Y,Z]=iX$. Therefore a dressing transformation can be constructed using $\{X, Y, Z\}$. In an embodiment of the present invention the dressing transformation is $V=\exp(-i\phi Z)$.

Embodiments of the present invention include dressed qubits states and physical Hamiltonians for quantum computers that are subject to anisotropic perturbation in two qubit interactions arising from spin-orbit couplings. See, for example, the Section relating to encoded quantum computing using Heisenberg interactions with anisotropy below.

Method for Using the Dressing Transformation

FIG. 3B illustrates a flowchart 350 describing a method used to prepare dressed qubits. In steps 303 and 304, the output from flowchart 300 of FIG. 3A, the dressing transformation V, is taken as input. In step 303, the physical, or ideal, Hamiltonian terms can be computed, or verified. Knowledge of the physical and ideal Hamiltonian terms can inform any decisions of a quantum computer operator. In step 304, the dressed states of the quantum computer can be computed. These dressed states can then be used to perform a single instance of quantum computation, or interpret the results therefrom. Alternatively, the dresses states for a specific instance of, or a given architecture of, a qubit, a plurality of qubits, or a quantum computer can be computed and recorded for future reference. The steps of flowchart 350 can be performed independently and therefore are drawn in parallel. Referring to step 303, Hamiltonian terms in the set of physical Hamiltonian terms H that describe the underlying system $S_A$ is generated from the ideal Hamiltonian terms $H^{ID}$ using the dressing transformation V. Further, the reverse computation in which one or more terms of $H^{ID}$ are generated from the dressing transformation and H can be done to verify that the correct combination of dressing transformation and dressed Hamiltonian terms $H^{ID}$ have been found. The output of step 303 is the set of physical Hamiltonian terms H. In step 304, the dressed qubit states are calculated, e.g. the dressing transformation takes the $i^{th}$ undressed state $|\Psi^{ID}\rangle_i$ to the dressed state $|\Psi\rangle_i$, where $|\Psi\rangle=V^{\dagger}|\Psi^{ID}\rangle$. The output of step 304, are the dressed states $|\Psi\rangle$.

In an embodiment of the present invention, once the dressing transformation V has been determined in step 302 it is applied to ideal Hamiltonians terms of the ideal quantum computer in step 303. Alternatively, in embodiments of the present invention, the dressing transformation V is applied to an entire quantum algorithm in step 303. A quantum algorithm is comprised of a time ordering of Hamiltonian terms. The dressing transformation is applied to Hamiltonians and basis states.

In certain embodiments of the invention, the dressing transformation is applied to the ideal Hamiltonians in the following manner. The dressing transformation is used to transform each Hamiltonian term, $H_{\alpha}=V^{\dagger}H^{ID}_{\alpha}V$ for all $\alpha$ where $\alpha$ is an index to individual Hamiltonian terms or index to individual Hamiltonian terms in a quantum algorithm. In certain embodiments of the invention this transformation can be done as a vector operation as, $H=\{H_{\alpha}|\alpha\in[0,N-1]\}$ is the set Hamiltonian terms of the actual system and $H^{ID}=\{H^{ID}_{\alpha}|\alpha\in[0,N-1]\}$ is from the ideal system. The dressing transformation takes the undressed state $|\Psi^{ID}\rangle$ to the dressed state $|\Psi\rangle$, where $|\Psi\rangle=V^{\dagger}|\Psi^{ID}\rangle$. These dressing transformations need not be done using a quantum computer. They can be done using a classical computer.

In an embodiment of the present invention, the dressing transformation V is used to create the dressed qubit states in step 304. For an embodiment of the present invention, where leakage in a qubit like 200 of FIG. 1 occurs, the dressed basis states can be computed by applying the equation:

$$|\Psi\rangle=V^{\dagger}|\Psi^{ID}\rangle$$

where the dressing transformation is defined as $V=\exp(-i\phi Z)$, and Z is as defined above. The ideal qubit basis states are $|0^{ID}\rangle$ and $|1^{ID}\rangle$, with leakage to qubit basis state $|2^{ID}\rangle$. The dressed qubit basis states become:

$$|0\rangle = \cos(\phi)|0^{ID}\rangle + \sin(\phi)|2^{ID}\rangle$$

$$|1\rangle = |1^{ID}\rangle$$

$$|2\rangle = -\sin(\phi)|0^{ID}\rangle + \cos(\phi)|2^{ID}\rangle$$

where $\phi$ is the arctangent of the magnitude of the leakage term from $H_1$. There are additional Hamiltonian terms, such as $H_2$ from the example above, which are created by the dressing transformation in the same way as $H_1$. The dressed Hamiltonian terms act on the dressed qubit basis states.

Embodiments of the present invention include the case where universal quantum computation (UQC) can be performed in both ideal and physical quantum computers. Where UQC is possible in the ideal quantum computer, the present invention allows for UQC to be performed in the actual quantum computer. In other words, the quantum computation in the dressed and undressed states, or in the actual and ideal systems is equivalent, $\Phi|H_\alpha|\Psi\rangle = \Phi^{ID}|H^{ID}_\alpha|\Psi^{ID}\rangle$ for all indices $\alpha$, i.e., $H_1$, $H_2$, etc.

Method to Use Dressed Qubits for Quantum Computation

Figure 4:
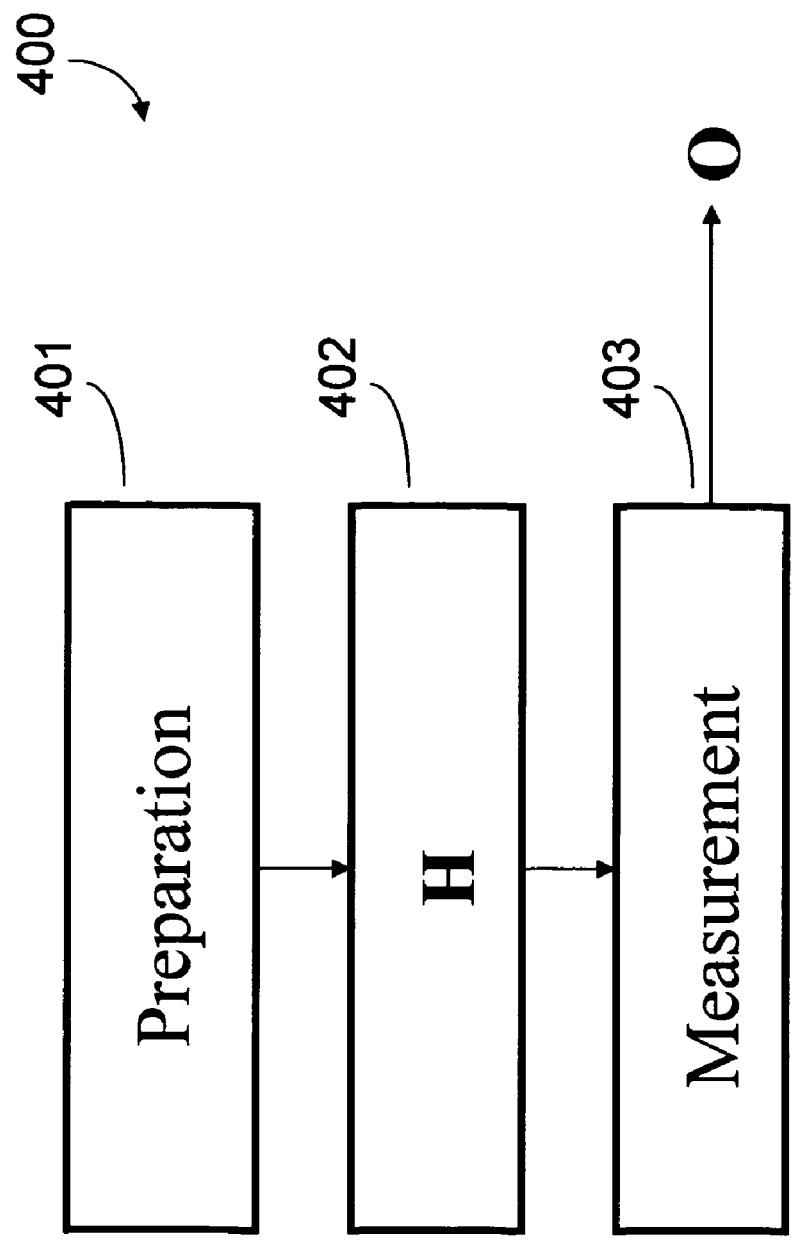
FIG. 4 illustrates a flowchart of the operations to use dressed qubits in accordance with the present invention.

FIG. 4 illustrates a flowchart 400, illustrating a method that utilizes dressed qubits and Hamiltonians. In step 401, the physical quantum computer is prepared in an initial fiducial (known) state. During initialization the states of the qubit may be dressed, via a quantum or classical implementation of the dressing transformation, before the quantum computation begins. In the next step 402, a quantum algorithm is applied to the quantum computer. In the final step of flowchart 400, step 403, measurement of the output of the quantum algorithm terminates the quantum computation. In step 403, the actual qubits of the quantum computer could be measured in the dressed basis. Alternatively, the qubits could be measured in a basis other than the dressed basis and classical postprocessing can be used to implement the undressing transformation in order to realize the correct measurements. In other words, like in the case of initialization, the states of the qubit must be undressed, via a quantum or classical implementation of the undressing transformation, before the measurements can be realized. The output of flowchart 400 is the result of the quantum algorithm, a vector of measurements O. Now that an overview of the process illustrated in FIG. 4 has been provided, each step in the process will be described in greater detail.

Step 401. In order to support universal quantum computing, each qubit used in the quantum computation must be initialized to a fiducial (known) state. See DiVincenzo in Braunstein and Lo, 2001, Scalable Quantum Computers, WILEY-VCH Verlag Berlin GmbH, which is hereby incorporated by reference in its entirety. Step 401 represents the general process of initializing each qubit, used in a subsequent quantum computation, to a fiducial (known) state $|\psi_0\rangle$. In some embodiments, fiducial states that have corresponding dressed states with specific properties are sought, as described in more detail below. In other embodiments, the properties of the dressed state that corresponds to the fiducial state of the qubits is not considered.

Each quantum state $|\Xi\rangle$ of a qubit can be described as an undressed basis state or a corresponding dressed basis state, or likely as a superposition of some basis states, without including both dressed and undressed. The dressed state includes terms to account for undesirable interactions between the $|0^{ID}\rangle$ and $|1^{ID}\rangle$ basis states of quantum state $|\Xi\rangle$ with higher ordered basis states such as $|2^{ID}\rangle$, $|3^{ID}\rangle$, $|4^{ID}\rangle$ and so forth. The corresponding undressed state does account for such interactions by aggregating them in with the interaction with $|2^{ID}\rangle$. The interactions between the $|0^{ID}\rangle$ and $|1^{ID}\rangle$ basis states and higher order basis states can be modeled using just the $|2^{ID}\rangle$ basis state. That is higher states, such as $|3^{ID}\rangle$, $|4^{ID}\rangle$, and indeed, the continuum, can be ignored in the dressed state. The continuum may be defined as a plurality of energy levels that are broad (i.e. they are imprecise) and close together. Accordingly, in some embodiments of the present invention, the dressed state for a given quantum state $|\Xi\rangle$ is represented by three basis states $|0\rangle$, $|1\rangle$, and $|2\rangle$. However, the methods of the present invention are not limited to dressed states that consist of just three basis states.

A dressed state and its corresponding undressed state describe the exact same quantum state $|\Gamma\rangle$ of a qubit. Because a dressed state and an undressed state describe the same quantum state $|\Gamma\rangle$ of a qubit, each basis state in the undressed state can be described in terms of a linear combination of the basis states in the corresponding dressed state. Furthermore, each basis state in the dressed state can be described in terms of a linear combination of the basis states in the corresponding undressed state. For example, consider the case where the quantum state $|\Gamma\rangle$, described in terms of the undressed state, is $|1^{ID}\rangle$. Here, "ID" stands for ideal in order to emphasize that interactions between $|1^{ID}\rangle$ and higher states such as $|2^{ID}\rangle$ are not taken into account in the undressed state. The exact same quantum state $|\Gamma\rangle$ can also be described in terms of the dressed basis. In other words, there exists a dressed state that corresponds to the undressed state $|1^{ID}\rangle$. If this dressed state includes the bases $|0\rangle$, $|1\rangle$, and $|2\rangle$, then the given quantum state $|\Gamma\rangle$, which is described as $|1^{ID}\rangle$ in the undressed state, can be described as a linear combination of $|0\rangle$, $|1\rangle$, and $|2\rangle$ in the dressed state. The exact nature of this linear combination will depend on the physical characteristics of the qubit.

Of particular interest in some implementations of the present invention are instances where the qubits used in quantum calculations have a pure fiducial state $|\psi_0\rangle$. A pure fiducial (known) state is basis independent when it is pure in the dressed basis and the undressed basis. A quantum state is pure when it adopts only one of the possible bases in a given state. The concept of "pure" is best explained by revisiting the notion of how a quantum state $|\Xi\rangle$ can be expressed. A quantum state $|\Xi\rangle$ is expressed in terms of basis states all selected from the same of basis (e.g., from the undressed basis or the dressed basis). For example, consider the case of a quantum state $|\Xi\rangle$ that is expressed in terms of the undressed state as follows:

$$|\Xi\rangle = \alpha|0^{ID}\rangle + \beta|1^{ID}\rangle$$

The quantum state $|\Xi\rangle$ is pure, with respect to the undressed state, if $\alpha=0$ and $\beta=1$, or vice versa. When a pure quantum state, as expressed in terms of an undressed basis, can also be expressed as a pure state in the dressed basis, then the pure quantum state is basis independent with respect to the dressed and undressed basis.

An example of a qubit having a pure fiducial state $|\psi_0\rangle$ that is basis independent with respect to both the dressed and undressed states is a current biased Josephson junction. A current biased Josephson junction has a quantum state $|\psi_0\rangle$ that, when described using the undressed basis, is $|1^{ID}\rangle$. This same quantum state $|\psi_0\rangle$, when described using the dressed basis, is $|1\rangle$. Thus, in the case of a current biased Josephson junction:

$$|\psi_0\rangle=|1\rangle=|1^{ID}\rangle.$$

Because of this relationship, the quantum state $|\psi_0\rangle$ is basis independent with respect to both the dressed and undressed states. In the case of the current biased Josephson junction, the state $|\psi_0\rangle$ is of interest because the qubit can be readily initialized to this state. Other types of qubits used in quantum computers also have the feature that they can be initialized to a pure fiducial state (e.g., $|\psi_0\rangle=|0\rangle$ or $|\psi_0\rangle=|1\rangle$ as opposed to $|\psi\rangle=\alpha|0\rangle+\beta|1\rangle$) that is basis independent with respect to both the undressed state and the dressed state.

In the case of qubits such as the current biased Josephson junction, the qubits can be initialized into a pure state that is basis independent with respect to both the undressed state and the dressed state. In other instances, each qubit used in step 402 is relaxed into an undressed ground state. For some types of qubits, such an undressed ground state is a pure state that is basis independent with respect to both the undressed state and the dressed state. For other types of qubits, such an undressed ground state is not basis independent with respect to both the undressed state and the dressed state. These two different scenarios will be addressed in turn.

In cases where the undressed ground state is a pure state that is basis independent with respect to both the undressed state and the dressed state, step 401 comprises placing each qubit used in step 402 into this undressed ground state. Typically, this is achieved by letting each qubit relax into the undressed ground state. Because the undressed ground state is, in fact, a pure state that is basis independent with respect to both the undressed state and the dressed state, this relaxation process is all that is required in step 401. The exact relaxation process used will depend on the physical characteristics of the qubits. Generally, the physical process to reach the undressed ground state involves cooling the qubits and then waiting a sufficiently long time such that the ground state is guaranteed to be fully populated.

In cases where the undressed ground state of a qubit is not basis independent with respect to both the undressed state and the dressed state, the present invention provides the following choices:

A. In some instances, the qubit is placed in the undressed ground state and quantum computation is initiated from the undressed ground state even though the dressed state that corresponds to the undressed ground state has not been described. This selection is typically chosen when the qubits are electron-spin coupled by Heisenberg exchange interactions (e.g., quantum dots or donor atoms in silicon arrays, see FIG. 2B).

B. In some instances, the undressed ground state has a corresponding dressed state that is known even though the undressed ground state of the qubit is not basis independent with respect to both the undressed state and the dressed state, equivalently expressions of a state in the dressed and undressed basis. For example, in the case of a current biased Josephson junction, the system can be initialized to a ground state $|\psi_g\rangle$, that, when expressed in undressed basis, is $|0^{ID}\rangle$. The state $|\psi_g\rangle$, when expressed in the dressed basis, is $\cos(\phi)|0\rangle-\sin(\phi)|2\rangle$, where $\phi$ is a representation of the error (interaction of the $|0\rangle$ and $|1\rangle$ basis states with higher basis states) for the qubit. Thus, in this instance, the undressed ground state $|0^{ID}\rangle$ has a corresponding dressed state that is known $(\cos(\phi)|0\rangle-\sin(\phi)|2\rangle)$. Thus, initialization of a current biased Josephson junction to $|\psi_g\rangle=|0^{ID}\rangle=\cos(\phi)|0\rangle-\sin(\phi)|2\rangle$ is all that is required in step 401 in this instance.

C. In some instances, qubits are relaxed to the undressed ground state. The dressed ground state that corresponds to this undressed ground state is not known. The dressed ground state is the basis state, in the dressed basis, of minimum energy. The dressing transformation is then applied to the qubit while it is in the undressed ground state. Application of the dressing transformation to the qubit while it is in the undressed ground state causes the qubit to adopt a quantum state that, when expressed in the dressed basis, is pure. For example, consider the case in which a quantum computer includes a Heisenberg exchange interaction and the dressing transformation is implemented on the quantum computer. In this example, the initialization method involves letting the quantum computer relax into the singlet encoded state $|0^{ID}\rangle_L$. Encoded qubits are denoted with a subscript L and defined below. A singlet state has less energy than a triplet state which, in the case of the present example includes $|1^{ID}\rangle_L$. Next, initialization includes the application of the dressing transformation. The initial dressed state is $|0\rangle_L$. The error in the quantum computer application of the dressing transformation will always be small and therefore if the dressing transformation is used only at the beginning (or end) of the quantum computation error will be bound. Other examples of step 401 are found in the example section below.

Step 402. In step 402 the quantum algorithm is run. In some embodiments, each gate that is performed in the quantum algorithm is run as if the quantum computer is, in fact, a universal quantum computer. In such embodiments, error (such as leakage) is contained by the use of known dressed states and the application of a dressing transformation.

The output of method 350 (FIG. 3B) is a Hamiltonian H that acts on qubits that are in known dressed states. In embodiments of the present invention, this Hamiltonian has a one to one correspondence between dressed and undressed Hamiltonian terms. Such a correspondence allows the user of the quantum computer to transparently implement quantum algorithms. The quantum computer contains dressed Hamiltonian terms and therefore every undressed Hamiltonian term in the gates applied during the quantum algorithm is automatically replaced with dressed Hamiltonian terms. Therefore, embodiments of the present invention exist where no Hamiltonian term needs be converted, i.e. there is no need to apply $H_\alpha=V^\dagger H^{ID}_\alpha V$. If a Hamiltonian term needs to be converted, such as in an embodiment of the present invention where the dressing transformation is non-separable, a classical preprocessor to the quantum computer can do this portion of step 402.

Step 403. The output of the quantum algorithm in step 402 is quantum computer in some total final state, which contains the final state of each qubit. In step 403, measuring the state of the qubits in the quantum computer, thereby obtaining O, terminates quantum computation. However, this measurement of the qubit states must ultimately be done in the dressed basis. In some embodiments, the measurement is performed in the dressed basis and in some embodiments, described below, the dressed basis representation of the quantum state is derived after measurement in a basis other than the dressed basis.

In an embodiment of the present invention where measurement in the dressed state is desired, such a measurement in the dressed basis may be directly possible. If a quantum computer supports measurement in the dressed basis then measurement vector O is produced by measuring the state of the qubits used in step 402.

In some embodiments, the dressed state is a pure state that is basis independent with respect to both the undressed state and the dressed state. In such embodiments, measurement in the undressed state is equivalent to measurement in the dressed state. Regardless, measurement in the dressed state can be implemented in accordance with the principles of quantum mechanics. The principles of quantum mechanics dictate that measurements correspond to the eigenvalues of Hermitian operators. However, no additional restrictions are placed on those operators. To perform a measurement in some other basis, the other basis is unitarily transformed to the basis of measurement. For example, a quantum computer that measures in the $\sigma^Z$ basis can be altered to measure in the $\sigma^X$ basis by applying a $\exp(-i\pi/2\sigma^X)$ pulse to the state of the qubit. The $\sigma^Z$ basis ($\sigma^X$ basis) are a set of bases equal to the eigenstates of the $\sigma^Z$ matrix ($\sigma^X$ matrix). A measurement in the $\sigma^Z$ basis is now equivalent to measuring in the $\sigma^X$ basis. See, for example, Nielsen & Chuang, 2000, Quantum Computation and Quantum Information, Cambridge University Press, Cambridge, 188 et seq., which is hereby incorporated by reference in its entirety.

In an embodiment of the present invention where the undressing transformation is implemented, a measurement in the dressed basis includes: (i) a quantum computation, (ii) the application of qubit operations, such as the undressing transformation, on the qubit, and (iii) measurement in the undressed basis.

In an embodiment of the present invention where measurement in the dressed basis is desired, teleportation techniques can be used. Single qubit operations followed by measurements can yield a measurement in any basis. The same is true of measurements preceding the single qubit operations in accordance with the principles of quantum mechanics. This teleportation technique involves the use of two qubit operations, ancilla qubits, and the application of teleportation-like techniques. Measurement of one of two ancilla qubits entangled with a data qubit can teleport the state of the data qubit to the second ancilla qubit. See U.S. Provisional Application Ser. No. 60/400,844 entitled "Methods for qubit gate teleportation," to Lidar, Wu, and Blais, as well as Nielsen, 2001, "Universal quantum computation using only projective measurement, quantum memory, and preparation of the $|0\rangle$ state," arXiv.org: quant-ph/0108020 v1, both of which are hereby incorporated by reference in their entireties. An aspect of teleporation techniques is that they require fewer types of qubit operations, such as not needing two single qubit operations, thereby lessening the complexity of physically implementing the undressing transformation.

In some embodiments, measurement in the dressed basis is implemented using classical post processing techniques. For example, a measurement in the dressed basis is replaced by a series of measurements in the undressed basis, producing a set of undressed measurements, and classical implementation of the dressing transformation on the set of undressed basis measurements is done. An aspect of this measurement system is that the quantum computer does not implement the dressing transformation. Other examples of step 403 are found in the example section below.

Encoded Quantum Computing using Heisenberg Interactions with Anisotropy

Embodiments of the present invention are applicable to dressed two qubit Hamiltonians that include perturbations that differentiate it from the undressed two qubit Hamiltonian. In an embodiment of the present invention for an ideal undressed system $R_I$, and a physical dressed system $R_A$ a difference $\Delta$ exists, i.e., $R_I-R_A=\Delta$. Strategies have been designed to cancel $\Delta$. These include removing $\Delta$ to first order by shaping pulses, canceling $\Delta$ in the absence of an external magnetic field, canceling $\Delta$ in the presence of single-qubit operations, or using $\Delta$ to generate a universal gate set that incurs some timing overhead. See L.-A. Wu, and D. A. Lidar, 2002, Phys. Rev. A 66, 062314; and G. Burkard and D. Loss, 2002, Phys. Rev. Lett. 88, 047903; N. E. Bonesteel et al., 2001, Phys. Rev. Lett. 87, 207901, each of which are hereby incorporated by reference in their entirety. These approaches to dealing with the spin-orbit interaction term are motivated by universal quantum computing with either the basis choice of the $S_z$ eigenstates for qubits, or with encoded qubits. However, by finding a dressing transformation computation, the dressed Hamiltonian can be used.

Embodiments of the present invention relate to quantum computing using Heisenberg interactions with anisotropy. The idealized Heisenberg exchange interaction $F_{ID_{kl}}=J_{kl}S_k \cdot S_l$ between spins $S_k$ and $S_l$ with indices k and l. The spins $S_k$ and $S_l$ represent the spins of particles k and l. Spin is a quantum mechanical property and can comprise the computational basis of a qubit wherein the qubit is comprised of a particle with a spin. The Heisenberg exchange interaction is central to a number of solid-state quantum computers. These include electrons in quantum dots as well as cite and donor atoms in Si substrates. See D. Loss and D. P. DiVincenzo, 1998, Phys. Rev. A 57, p. 120, U.S. Pat. No. 6,472,68 1, each of which are hereby incorporated by reference in its entirety. The Heisenberg exchange interaction has been shown to be universal for quantum computation. That is, a universal quantum computer can be made without employing difficult to implement single-qubit gates. This is done with the proviso that one codes an encoded qubit into the state of several spins. See, D. Bacon et al, 2000, Phys. Rev. Lett. 85, p. 1758; J. Kempe et al., 2001, Phys. Rev. A 63, 042307; and D. P. DiVincenzo et al., 2000, Nature 408, 339. However, these proposals are under development since the ideal Heisenberg Hamiltonian is perturbed by an anisotropic term arising due to spin-orbit interactions. The physical Hamiltonian is $$F_{kl}=J_{kl}\{S_k \cdot S_l+D \cdot S_k \times S_l+\gamma(S_k \cdot D)(S_l \cdot D)\}$$

where D is a vector (known as the Dzyaloshinskii-Moriya vector in solid-state physics), that is used to compactly represent the Hamiltonian, as it describes the bond between spins k and l. The direction of the Dzyaloshinskii-Moriya vector is determined by the geometry of spins l and k and its scalar by the strength of the spin-orbit coupling. See, I. Dzyaloshinskii, Sov. Phys. JETP 5, p. 1259 (1957), and T. Moriya, Phys. Rev. 120, p. 91 (1960), each of which is incorporated by reference in its entirety. Further, $\gamma=[(1+|D|^2)^{1/2}-1]/(|D|^2)$. It is believed that $|D|$ is in the range 0.01-0.8 in coupled quantum dots in GaAs. This is at least two orders of magnitude beyond the current fault-tolerance threshold estimates of quantum error correction theory, about $10^{-4}$ errors per gate. Therefore, the anisotropic perturbation can be considered as a difference $\Delta$.

In an embodiment of the present invention, dressed qubits can be defined for the actual Heisenberg exchange interaction, $F_{kl}$. Such dressed qubits offer a solution that is fully compatible with the encoded qubits approach, at no extra overhead and without any approximations, other than the assumption that D is time-independent. In an embodiment of the present invention, any residual time-dependence of the perturbations to a Hamiltonian may be corrected, if small enough, by using quantum error correcting codes. In an embodiment of the present invention, any residual time-dependence of D is small enough that it can be corrected using quantum error correcting codes. Quantum error correcting codes are well known in the art and are described in Nielsen & Chuang, 2000, Quantum Computation and Quantum Information, Cambridge University Press, Cambridge, which is hereby incorporated by reference its entirety.

A dressing transformation can be derived by following procedures described above. First a set of SU(2) operators for $F_{kl}$ the physical Hamiltonian is selected. The terms for a perturbed exchange Hamiltonian could be the set:

$$P_{kl} = S_k \cdot S_l - (S_k \cdot n)(S_l \cdot n)$$

$$Q_{kl} = n \cdot S_k \times S_l$$

$$R_{kl} = \frac{1}{2} n \cdot (S_l - S_k),$$

where $n = D/|D|$ is a unit vector. Therefore using these terms, $F_{kl} \propto P_{kl} + Q_{kl}$. Further note that $[R_{kl}, (S_k \cdot n)(S_l \cdot n)] = 0$, that is $R_{kl}$ and $(S_k \cdot n)(S_l \cdot n)$ commute, that is, $n \cdot (S_l - S_k) \cdot (S_k \cdot n)(S_l \cdot n) - (S_k \cdot n)(S_l \cdot n) \cdot n \cdot (S_l - S_k) = 0$. It therefore follows by direct substitution into equation, with $J_X = P_{kl}$ and $J_Y = Q_{kl}$:

$$\sqrt{1+\delta^2} e^{-i\phi J_Z} J_X e^{i\phi J_Z} = J_X + \delta J_Y$$

that $W_{kl} = \exp[-i\frac{1}{2} \in n \cdot (S_l - S_k)]$. $W_{kl}$ is a dressing transformation for this quantum computer such that $F_{kl} = W_{kl}^\dagger F_{kl}^{ID} W_{kl}$, where $F_{kl}^{ID} = (1+|D|^2)^{1/2} J_{kl} S_k \cdot S_l$ is the isotropic Heisenberg interaction, $\in = \tan^{-1}|D|$, and $n = D/|D|$.

In another embodiment of the present invention, the set $\{P_{kl}, Q_{kl}, R_1 = n \cdot S_l\}$ satisfies the pair of SU(2) commutation relations $[R_1, P_{kl}] = iQ_{kl}, [Q_{kl}, R_1] = iP_{kl}$. It again follows that a dressing transformation for this quantum computer can be found, $T_l = \exp(i \in n \cdot S_l)$ is a transformation such that $F_{kl} = T_l^\dagger F_{kl}^{ID} T_l = T_k F_{kl}^{ID} T_k^\dagger$.

There are encoded qubits, arrangements of more than one physical qubit, under which the Heisenberg interaction alone becomes universal for quantum computing. The most economical encoded qubit arrangement uses the two total spin-one-half representations of three spin-one-half particles to encode a qubit, see E. Knill, R. Laflamme and L. Viola, 2000, Phys. Rev. Lett. 84, p. 2525, which is hereby incorporated by reference in its entirety. A convenient choice for logical qubit basis states are the two states:

$$|0_L^{ID}\rangle_z = |s\rangle_{12}|\uparrow\rangle_3 \text{ and}$$

$$|1_L^{ID}\rangle_z = (2/3)^{1/2}|\uparrow\rangle_1|\uparrow\rangle_2|\downarrow\rangle_3 - (1/3)^{1/2}|t\rangle_{12}|\uparrow\rangle_3,$$

where $$|s\rangle_{12} = (|\uparrow\rangle_1|\downarrow\rangle_2 - |\downarrow\rangle_1|\uparrow\rangle_2)/(2)^{1/2}, \text{ and}$$

$$|t\rangle_{12} = (|\uparrow\rangle_1|\downarrow\rangle_2 + |\downarrow\rangle_1|\uparrow\rangle_2)/(2)^{1/2}$$

are the singlet and triplet states of spins 1 and 2. The subscript z denotes that these encoded states in the z basis, i.e. the basis states are eigenstates of the sigma z matrix. A method of creating singlet and triplet states is described in U.S. patent application Ser. No. 10/628,128, entitled "Methods of Single Qubit Gate Teleportation," which is hereby incorporated by reference in its entirety. Singlet states can be established by cooling the qubits in the presence of tunneling. A triplet state can be made from a singlet state, through single and two qubit operations. Other methods of state preparation are discussed hereinbelow.

The z subscript indicates that these two states have total spin projection $S_z = +\frac{1}{2}$. Because $F_{kl}^{ID}$ is a scalar multiple of the total spin, a qubit can also be represented by states with the choice of basis along an arbitrary direction n (as opposed to the z direction in the case of the choice of the $S_z$ eigenstates as the basis for qubits); in this case notation used is $|0_L^{ID}\rangle_n$, $|1_L^{ID}\rangle_n$, and an arbitrary $l^{th}$ encoded qubit state is written as $|\Phi^{ID}\rangle_l = a|0_L^{ID}\rangle_{nl} + b|1_L^{ID}\rangle_{nl}$, where $|a|^2 + |b|^2 = 1$. A convenient set of universal gates was found for the $|0_L^{ID}\rangle_z$, $|1_L^{ID}\rangle_z$ encoding. The evolution operators are choices from the set $U^{id} = \{U_{12}^{ID}(\theta), U_{23}^{ID}(\theta), U_{45}^{ID}(\theta), U_{56}^{ID}(\theta), U_{34}^{ID}(\theta)\}$, where $U_{kl}^{ID}(\theta) = \exp(-i\theta S_k \cdot S_l)$ are universal for two logical qubits encoded into the states of spins 1-3 and 4-6. The first four gates of $U^{ID}$ serve as logical single-qubit operations for the two encoded qubits and the last operation, $U_{34}^{ID}(\theta)$, serves to entangle the two logical qubits via a controlled-phase, CPHASE gate.

A method for constructing the logic gates in $U^{id}$ directly in terms of the actual interaction $F_{kl}$ will now be described. The $l^{th}$ logical qubit is encoded by physical qubits $3l$-2, $3l$-1, and $3l$. The state of the arbitrary $l^{th}$ dressed qubit is defined as $$|\Phi\rangle_l = T^\dagger_{3l-2,3l}|\Phi^{ID}\rangle_l,$$

where $T_{3l-2,3l}$ is the dressing transformation with $T_{kl} = W_{kl}^2$.

In an embodiment of the present invention, the single-qubit operations that act on the dressed qubit have the same effect as the single qubit operations that act on the undressed qubits. In an embodiment of the present invention, the single-qubit operations that act on the dressed qubits, defined by dressing transformation T, have the same effect as the single-qubit operations that act on the undressed qubits. Denote $U_{kl}(\theta) = \exp(-\theta H_{kl})$. It is so that $U_{12}(\theta)|\Phi\rangle_1 = [T_l U_{12}^{ID}(\theta) T_l^\dagger][T_{13}^\dagger |\Phi^{ID}\rangle_1] = T_{13}^\dagger U_{12}^{ID}(\theta)|\theta^{ID}\rangle$ and similarly $U_{23}(\theta)|\Phi\rangle_1 = T_{13}^\dagger U_{23}^{ID}(\theta)|\Phi^{ID}\rangle_1$.

Therefore, $_1\Psi|U_{12(23)}(\theta)|\Phi\rangle_1 = _1\Psi^{ID}|T_{13}T_{13}^\dagger U_{12(23)}^{ID}(\theta)$
$|\Phi^{ID}\rangle_1 = _1\Psi^{ID}|U_{12(23)}^{ID}(\theta)|\Phi^{ID}\rangle_1,$ meaning that matrix elements of $U_{12}(\theta)$ and $U_{23}(\theta)$ in the dressed basis are identical to those in the idealized basis. Thus all single encoded-qubit operations can be performed using $F_{kl}$, provided the dressed basis is used.

Figure 6:
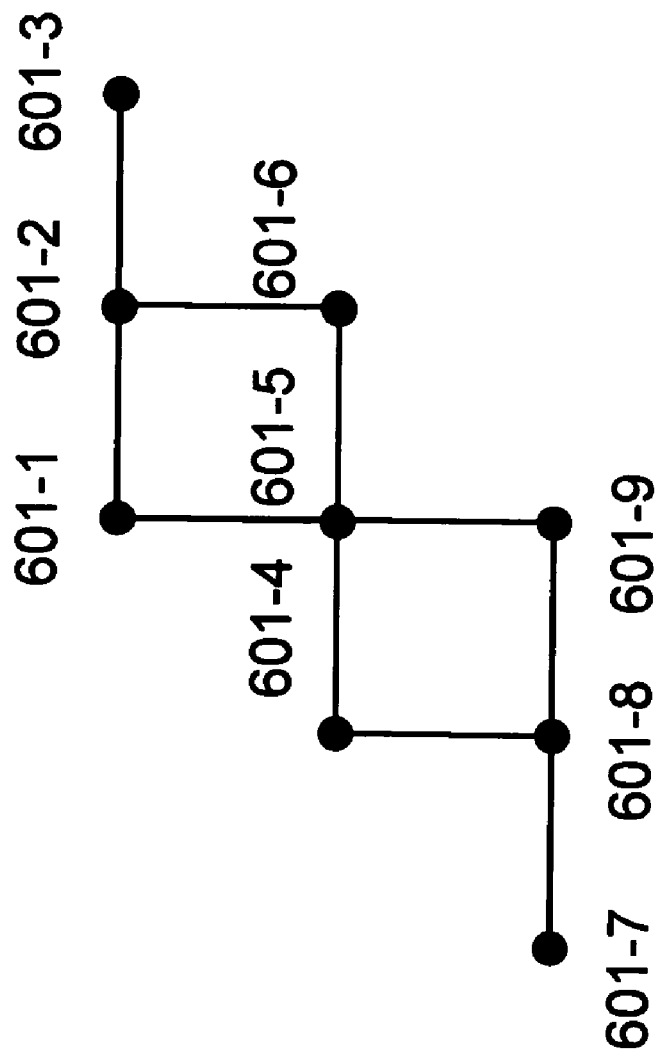
FIG. 6 illustrates a geometry for three-qubit encoding in accordance with one embodiment of the invention.

In an embodiment of the present invention, the two-qubit operations that act on the dressed qubit have the same effect as the single qubit operations that act on the undressed qubits. In an embodiment of the present invention, the two-qubit operations that act on the dressed qubits, defined by dressing transformation T, have the same effect as the two-qubit operations that act on the undressed qubits. By using a sequence of swaps, $U_{kl}^{ID\dagger}(\pi/4) U_{lm}^{ID}(\theta) U_{kl}^{ID}(\pi/4) = U_{km}^{ID}(\theta)$, the two-qubit gate $U_{lm}^{ID}(\theta)$ can be replaced by $U_{km}^{ID}(\theta)$. The qubits k, l, m are sequential qubits 601 in FIG. 6. The entangling gate $U_{34}^{ID}(\theta)$ can be replaced by $U_{15}^{ID}(\theta)$ or $U_{26}^{ID}(\theta)$. If the physical qubits 601-1 through 601-N are arranged as shown in FIG. 6, then $U_{15}^{ID}(\theta)$ is a nearest neighbor interaction. If $|\Phi\rangle_l = T^\dagger_{3l-2,3l}|\Phi^{ID}\rangle_l$, for an arbitrary $l^{th}$ qubit, then a two-encoded-qubit dressed state is $|\Phi\rangle_1|\Phi\rangle_2 = T_{13}^\dagger T_{46}^\dagger |\Phi^{ID}\rangle_1 |\Phi^{ID}\rangle_2$. Then $U_{15}(\theta)|\Phi\rangle_1|\Phi\rangle_2 = [T_1 U_{15}^{ID}(\theta) T_1^\dagger]$ $[T_{13}^\dagger T_{46}^\dagger |\Phi^{ID}\rangle_1 |\Phi^{ID}\rangle_2] = ]T_{13}^\dagger T_{46}^\dagger U_{15}^{ID}(\theta)|\Phi^{ID}\rangle_1|\Phi^{ID}\rangle_2$, meaning that $U_{15}(\Phi)$ plays the same role in the dressed basis as does $U_{15}^{ID}(\Phi)$ in the idealized basis.

Therefore the set $U=\{U_{12}(\theta), U_{23}(\theta), U_{45}(\theta), U_{56}(\theta), U_{15}(\theta)\}$, where the numbers 1 through 6 refer to qubits 601-1 through 601-6. The set U is universal for dressed qubits and has the same matrix representations as in the idealized basis. With the arrangement shown in FIG. 6, spins (601-1,601-5), (601-2,601-6), (601-4,601-8), (601-5,601-9) are nearest neighbors, and $F_{kl}$ interactions between them can be used to generate a CPHASE gate between any pair of encoded qubits.

The dressed qubits can be prepared in an initial state and measured. Preparation and measurement can be performed in a manner analogous to a procedure proposed for the idealized Heisenberg Hamiltonian. See D. P. DiVincenzo, et al., 2000, Nature 408, 339, which is hereby incorporated by reference in its entirety. In the ideal case the computational basis state $|0_L\rangle_n = |s\rangle_{kl}|\uparrow\rangle_{3n}$ can be prepared by turning on a strong exchange interaction between spins k,l, and a moderately strong magnetic field Bn. The vector n represents the direction of the magnet field. The field is of such a magnitude that $k_B T \ll g\mu_B B < J$, where $k_B T$ is the thermal energy of the system, $\mu_B$ is the Bohr magnetron, and g is a particle and system dependent factor (scalar or tensor) have magnitude near unity. In applying the moderately strong magnetic field the system then relaxes to the ground state $|s\rangle_{kl}$ and the third spin is oriented along n. The dressed state $|0_L\rangle = T_{km}^\dagger |s\rangle_{kl} |\uparrow\rangle_{mn}$ which is proportional to $\exp(i\epsilon n \cdot S_l)|s\rangle_{kl}|\uparrow\rangle_{mn}$ can be similarly prepared. Because $V_{km}^\dagger |s\rangle_{kl}$ is the ground state of the physical Hamiltonian $H_{kl}$. Preparing a spin system in the ground state of its physical Hamiltonian can be accomplished by turning on a large magnetic field to align all spins and removing it adiabatically.

Computation can performed with gates applied from the set U. A measurement procedure is to differentiate $|0_L^{ID}\rangle_z$ from $|1_L^{ID}\rangle_z$ by distinguishing a singlet $|s\rangle = (|\uparrow\rangle|\downarrow\rangle - |\downarrow\rangle|\uparrow\rangle)/(2)^{1/2}$ from a triplet $|t\rangle = (|\uparrow\rangle|\downarrow\rangle + |\downarrow\rangle|\uparrow\rangle)/(2)^{1/2}$ state. This can be done using techniques known in the art. For instance the alternative current capacitance scheme proposed in the art can be used, see Kane in Braunstein and Lo (eds.), 2001, Scalable quantum computers, Wiley-VCH, New York, which is hereby incorporated by reference in its entirety. Note that this is a measurement of whether the encoded qubit is in the state $|0_L^{ID}\rangle_z = |s\rangle_{12}|\uparrow\rangle_3$ or $|0_L^{ID}\rangle_z$, thus the state of the third spin does not need to be measured. This is a measurement of the idealized observable $H_{12}^{ID}$. However, a measurement of the actual observable of $H_{12}$, will serve to determine whether the encoded qubit is in the state $|0_L\rangle_z$, providing a readout method on one logical qubit.

A complete description of a scheme for universal quantum computing with anisotropic Heisenberg Hamiltonian has been given. Preparation, measurement, single, and two qubit operations are possible in a dressed basis that overcomes the effect of errors inherent in the anisotropic Heisenberg Hamiltonian, without eliminating these errors. Embodiments of the present invention include logical qubits comprising three or more physical qubits, or spins.

All references cited herein are incorporated herein by reference in their entirety and for all purposes to the same extent as if each individual publication or patent or patent application was specifically and individually indicated to be incorporated by reference in its entirety for all purposes.

Many modifications and variations of this invention can be made without departing from its spirit and scope, as will be apparent to those skilled in the art. Those of skill in the art will appreciate that a dressing transformation is the inverse of a dressing transformation. Therefore, as used herein no attempt was made to distinguish between dressing transformations and undressing transformations. Rather, as used herein the term dressing transformation is used interchangeably to mean either a dressing transformation or a transformation. In some cases, the term undressing transformation was used to provide additional clarity. The specific embodiments described herein are offered by way of example only, and the invention is to be limited only by the terms of the appended claims, along with the full scope of equivalents to which such claims are entitled.

We claim:

1. A quantum computing method, comprising:
   (A) constructing a dressing transformation V between a physical Hamiltonian H and an ideal Hamiltonian $H^{ID}$, wherein
   said physical Hamiltonian H describes a physical quantum computer that comprises a plurality of qubits, including interactions between said plurality of qubits and an error source,
   said ideal Hamiltonian $H^{ID}$ describes a universal quantum computer that corresponds to said physical quantum computer,
   and, for a dressed state $|\psi\rangle$ of said physical quantum computer, said dressing transformation V has the property that $$|\psi\rangle = V^\dagger |\psi^{ID}\rangle$$

where
   $|\psi^{ID}\rangle$ is an undressed state in the universal quantum computer that corresponds to the given dressed state $|\psi\rangle$ of said physical quantum computer, and
   $V^\dagger$ is the Hermitian conjugate of said dressing transformation V;
   (B) initializing each qubit in said plurality of qubits to a known state;
   (C) performing a quantum calculation using said plurality of qubits; and
   (D) measuring said plurality of qubits.

2. The method of claim 1 wherein said physical Hamiltonian H is determined by characterizing said physical quantum computer.

3. The method of claim 2 wherein said characterizing said physical quantum computer comprises using quantum process tomography.

4. The method of claim 1 wherein said dressed state $|\psi\rangle$ of said physical quantum computer comprises the state of a qubit in said plurality of qubits and wherein said state of said qubit includes a basis state that represents interactions between a first basis state or a second basis state of said qubit and a continuum of basis states of said qubit.

5. The method of claim 1 wherein said undressed state $|\psi^{ID}\rangle$ of said universal quantum computer comprises the state of a qubit in said plurality of qubits and wherein said state of said qubit does not include a basis state that represents interactions between a first basis state or a second basis state of said qubit and a continuum of basis states of said qubit.

6. The quantum computing method of claim 1 wherein said initializing comprises placing each qubit in said plurality of qubits in a known dressed state.

7. The quantum computing method of claim 1 wherein said performing said quantum calculation comprises applying a plurality of quantum gates to said physical quantum computer.

8. The quantum computing method of claim 7 wherein a quantum gate in said plurality of quantum gates is converted from an undressed basis to a dressed basis by application of said dressing transformation prior to application of said quantum gate to said physical quantum computer.

9. The quantum computing method of claim 1 wherein said dressing transformation has the property that $H=V^{\dagger}H^{ID}V$, where $V^{\dagger}$ is the Hermitian conjugate of said dressing transformation V.

10. The quantum computing method of claim 1 wherein said dressing transformation is separable with respect to said plurality of qubits.

11. The quantum computing method of claim 10 wherein said dressing transformation V has the property $$H_\alpha = V^{\dagger} H^{ID}_\alpha V$$

where α is an index to corresponding terms in H and $H^{ID}$.

12. The quantum computing method of claim 1 wherein said dressing transformation is non-separable with respect to said plurality of qubits.

13. The quantum computing method of claim 1 wherein said measuring said plurality of qubits in said dressed basis comprises:
measuring said plurality of qubits in an undressed basis to form a result; and
applying said dressing transformation to said result using a post-processing method.

14. The method of claim 1 wherein said initializing comprises placing one or more qubits in said plurality of qubits in a pure fiducial state that is basis independent with respect to both a dressed state and an undressed state.

15. The method of claim 14 wherein said one or more qubits are current biased Josephson junctions and said pure fiducial state that is basis independent with respect to the dressed state and the undressed state is $\psi_0$, where $\psi_0 = |1\rangle$ and $\psi_0 = |1^{ID}\rangle$.

16. The method of claim 1 wherein said initializing each qubit in said plurality of qubits comprises relaxing one or more of said plurality of qubits to a pure undressed ground state that is basis independent with respect to both a dressed state and an undressed state.

17. The method of claim 16 wherein said relaxing comprises cooling said one or more qubits for a sufficiently long time to fully populate said pure undressed ground state.

18. The method of claim 1 wherein
said initializing each qubit in said plurality of qubits comprises relaxing said plurality of qubits to an undressed ground state that does not have a known corresponding dressed state; and
said measuring includes applying said dressing transformation to said plurality of qubits.

19. The method of claim 18 wherein said plurality of qubits are electron-spin coupled by Heisenberg exchange interactions.

20. The method of claim 19 wherein said plurality of qubits comprise quantum dots or donor atoms in silicon arrays.

21. The method of claim 1 wherein said initializing each qubit in said plurality of qubits comprises relaxing one or more qubits in said plurality of qubits to an undressed ground state that has a known corresponding dressed state.

22. The method of claim 21 wherein a qubit in said one or more qubits is a current biased Josephson junction and said initializing comprises setting said qubit to the ground state $\psi_g$, where $\psi_g$, when expressed in bases selected from an undressed state, is $|0^{ID}\rangle$, and where $\psi_g$, when expressed in bases selected from the dressed state, is $\cos(\phi)|0\rangle - \sin(\phi)|2\rangle$, where $\phi$ is a representation of the interaction of the $|0\rangle$ and $|1\rangle$ basis states with higher basis states of the current biased Josephson junction.

23. The method of claim 1 wherein
said initializing each qubit in said plurality of qubits comprises relaxing said plurality of qubits to an undressed ground state that does not have a known corresponding dressed state; and
applying said dressing transformation to each qubit in said plurality of qubits while it is in the undressed ground state thereby causing the qubit to adopt a quantum state ψ that, when expressed in terms of the dressed basis, is pure.

24. The method of claim 23 wherein said plurality of qubits are characterized by a Heisenberg exchange interaction.

25. The method of claim 1, wherein the steps of initializing, performing a quantum calculation, and measuring a plurality of qubits, are performed after constructing a dressing transformation.

26. The method of claim 1, wherein the steps of initializing, performing a quantum calculation, and measuring a plurality of qubits, are performed before constructing a dressing transformation.

27. A quantum computing method, comprising:
providing a dressing transformation for a quantum computing system;
identifying a dressed Hamiltonian;
initializing the quantum computing system in a known state;
applying the dressed Hamiltonian to the quantum computing system;
performing a readout on the quantum computing system to yield readout information; and
applying the dressing transformation to undress the readout information.

28. The method of claim 27, wherein the known state is a pure state in a basis selected from the group consisting of a dressed basis, an undressed basis, and both the dressed and undressed basis.

29. A quantum computing method, comprising;
providing an ideal Hamiltonian set that is known to be universal for quantum computing; and
providing a Hamiltonian set for a physical system;
computing a dressing transformation between the ideal Hamiltonian set and the Hamiltonian set for a physical system; and
determining the dressed states of the physical system, wherein the dressed states of the physical system and the Hamiltonian set for a physical system quantum computation using the Hamiltonian set is universal.

* * * * *